United States Patent
Ito et al.

(10) Patent No.: US 6,285,921 B1
(45) Date of Patent: Sep. 4, 2001

(54) ROBOT CONTROL APPARATUS WITH FUNCTION FOR ROBOT BACKWARD OPERATION

(75) Inventors: Takayuki Ito; Tetsuya Kosaka; Takeaki Aramaki, all of Minamitsuru-gun (JP)

(73) Assignee: Fanuc, Ltd., Yamanashi (JP)

( * ) Notice: Subject to any disclaimer, the term of this patent is extended or adjusted under 35 U.S.C. 154(b) by 0 days.

(21) Appl. No.: 09/011,963

(22) PCT Filed: Jun. 20, 1997

(86) PCT No.: PCT/JP97/02137

§ 371 Date: Feb. 20, 1998

§ 102(e) Date: Feb. 20, 1998

(87) PCT Pub. No.: WO97/49016

PCT Pub. Date: Dec. 24, 1997

(30) Foreign Application Priority Data

Jun. 20, 1996 (JP) .................................................. 8-178691

(51) Int. Cl.[7] .................................................. G05B 19/00
(52) U.S. Cl. .................................................. 700/264; 700/250
(58) Field of Search .................................. 701/3, 82; 700/18, 700/264, 252, 86–88, 253, 250; 318/568.11, 568.12, 567

(56) References Cited

U.S. PATENT DOCUMENTS

| | | | |
|---|---|---|---|
| 4,902,950 | * 2/1990 | Kawamura et al. | 318/627 |
| 5,008,834 | * 4/1991 | Mizuno et al. | 364/513 |
| 5,023,788 | * 6/1991 | Kitazume et al. | 701/3 |
| 5,046,021 | * 9/1991 | Salvagnini | 364/513 |
| 5,170,034 | * 12/1992 | Seshimo et al. | 219/125.1 |
| 5,254,923 | * 10/1993 | Kanitani | 318/568.11 |
| 5,299,114 | * 3/1994 | Onishi et al. | 700/18 |
| 5,331,264 | * 7/1994 | Cheng et al. | 318/568.11 |
| 5,446,445 | * 8/1995 | Bloomfield et al. | 340/521 |
| 5,565,854 | * 10/1996 | Kataoka et al. | 340/825.06 |
| 5,637,969 | * 6/1997 | Kato et al. | 318/432 |
| 5,872,894 | * 2/1999 | Watanabe et al. | 700/252 |

FOREIGN PATENT DOCUMENTS

| | | |
|---|---|---|
| 0368088A1 | 11/1988 | (EP) . |
| 0368088B1 | 11/1988 | (EP) . |
| 0673726A2 | 9/1995 | (EP) . |
| 0673726A3 | 7/1996 | (EP) . |
| 60-198604 | 10/1985 | (JP) . |
| 63-250705 | 10/1988 | (JP) . |
| 1-91905 | 6/1989 | (JP) . |
| 2-22708 | 1/1990 | (JP) . |
| 4-167103 | 6/1992 | (JP) . |
| 5-165513 | 7/1993 | (JP) . |
| 7-104817 | 4/1995 | (JP) . |

OTHER PUBLICATIONS

Patent Abstracts of Japan, No. 60160411, Aug. 22, 1985.

\* cited by examiner

*Primary Examiner*—Paul P. Gordon
(74) *Attorney, Agent, or Firm*—Staas & Halsey LLP

(57) ABSTRACT

A robot control apparatus having an expanded and improved backward operation function. During forward operation according to an operation program, command types, line numbers, robot positions, I/O signal states before execution of related commands, and values before execution of computation commands are stored in a history table. In the backward operation, the data written in the history table is read backward, command type discrimination is made, and backward operation processing is executed in accordance with the result of discrimination. For backward operation dedicated commands, a separately taught backward operation dedicated command is read and executed. If, however, the read command is a command to output a signal to a cooperative device, the signal output command is executed after completion of the robot motion to the stored position. For I/O commands, I/O signals are automatically inverted or are individually set after the motion to the stored position is completed.

15 Claims, 18 Drawing Sheets

FIG. 4

(*2) EXECUTION HISTORY TABLE

| ROW | COLUMN 1<br>COMMAND TYPE | COLUMN 2<br>LINE NO. | COLUMN 3<br>POSITION | COLUMN 4<br>SIGNAL STATE BEFORE CHANGE | COLUMN 5<br>VALUE BEFORE CHANGE |
|---|---|---|---|---|---|
| 1 | TYPE 2 | 1 | POSITION [1] | — | — |
| 2 | TYPE 2 | 2 | POSITION [2] | — | — |
| 3 | TYPE 3 | 3 | POSITION [2] | OFF | — |
| 4 | TYPE 2 | 4 | POSITION [3] | — | — |
| 5 | TYPE 3 | 5 | POSITION [3] | ON | — |
| 6 | TYPE 2 | 6 | POSITION [4] | — | — |
| 7 | TYPE 1 | 7 | POSITION [4] | — | — |
| 8 | TYPE 1 | 8 | — | — | 5 |
| 9 | TYPE 4 | 9 | — | — | — |
| 10 | TYPE 5 | 10 | — | — | — |
| 11 | ... | ... | ... | ... | ... |
| 12 | ... | ... | ... | ... | ... |
| 13 | ... | ... | ... | ... | ... |

(*4) : INVERSION SPECIFICATION CAN BE CHANGED BY VARIABLE SETTING OF SYSTEM.
(*5) : SCREEN OF FIG. 6 IS DISPLAYED AT TEACHING PANEL TO ALLOW ON/OFF SELECTION.

(*6) I/O SELECTION MESSAGE

```
SELECT SIGNAL STATE TO BE OUTPUT.
        ON              OFF
```

FIG. 7

◇ MAIN PROGRAM
   1 : EACH AXIS     POSITION [1]    100%    POSITIONING
   2 : EACH AXIS     POSITION [2]    100%    POSITIONING
   3 : SDO [1] = ON
   4 : EACH AXIS     POSITION [3]    100%    POSITIONING
   5 : SDO [1] = OFF
   6 : EACH AXIS     POSITION [4]    100%    POSITIONING
   7 : SDO [2] =ON (OFF) ⟶ BACKWARD MODE DEDICATED COMMAND: PARENTHESIZED
                                      DURING BADKWARD OPERATION, SDO [2] IS SET OFF.
   8 : CALL BADKWARD SUBPROGRAM ⟶ BACKWARD MODE DEDICATED COMMAND
                                        SUBPROGRAM IS EXECUTED ONLY DURING BACKWARD OPERATION.
   9 : REG [1] ← REG [1] + 1
 10 : IF REG [1] < 10 JUMP TO LABEL [1]
 11 : REG [1] ← 0
 12 : SDO [3] = ON
 13 : LABEL [1]
 14 : EACH AXIS     POSITION [1]    100%    POSITIONING

[TASK PERFOMED]

LINE 1 : MOVE TO POSITION [1]
  LINE 2 : MOVE TO POSITION [2]
  LINE 3 : SET HAND OPEN/CLOSE SIGNAL SDO [1] ON, TO GRASP WORKPIECE
  LINE 4 : MOVE TO POSITION [3]
  LINE 5 : SET HAND OPEN/CLOSE SIGNAL SDO [1] OFF, TO RELEASE WORKPIECE ONTO CONVEYOR
  LINE 6 : MOVE TO POSITION [4]
  LINE 7 : SET CONVEYOR FORWARD TRAVEL SIGNAL SDO [2] ON, TO MOVE CONVEYOR FORWARD
  LINE 8 : EXECUTE SUBPROGRAM ONLY DURING BACKWARD OPERATION (SKIP DURING FORWARD OPERATION)
  LINE 9 : INCREMENT VALUE OF REGISTER [1] BY '1'
  LINE 10 : IF REGISTER [1] VALUE IS NOT '10', JUMP TO LABEL [1]
             IF REGISTER [1] VALUE IS '10', PROCEED TO LINE 11
  LINE 11 : INITIALIZE REGISTER [1] TO VALUE '0'
  LINE 12 : SET WORKPIECE BOX CHANGE SIGNAL SDO [3] ON, TO CHANGE WORKPIECE BOXES
  LINE 13 : LABEL [1]
 14行目 : MOVE TO POSITION [1]

◇ SUBPROGRAM

1 : SDO [4] = ON

[TASK PERFORMED]

LINE 1 : SET CONVEYOR BACKWARD TRAVEL SIGNAL SDO [4] ON, TO MEVE CONVEYOR BACKWARD

FIG. 13

DATA IN EXECUTION HISTORY TABLE STORED DURING FORWARD OPERATION

| | COMMAND TYPE | LINE NO. | POSITION | SIGNAL STATE BEFORE CHANGE | VALUE BEFORE CHANGE | CORRESPONDENCE TO PROGRESS OF BACKWARD OPERATION FLOW |
|---|---|---|---|---|---|---|
| 1 | TYPE 2 | 1 | POSITION [1] | — | — | ← BACKWARD OPERATION (12) |
| 2 | TYPE 2 | 2 | POSITION [2] | — | — | ← BACKWARD OPERATION (11) |
| 3 | TYPE 3 | 3 | POSITION [2] | OFF | — | ← BACKWARD OPERATION (10) |
| 4 | TYPE 2 | 4 | POSITION [3] | — | — | ← BACKWARD OPERATION (9) |
| 5 | TYPE 3 | 5 | POSITION [3] | ON | — | ← BACKWARD OPERATION (8) |
| 6 | TYPE 2 | 6 | POSITION [4] | — | — | ← BACKWARD OPERATION (7) |
| 7 | TYPE 1 | 7 | POSITION [4] | — | — | ← BACKWARD OPERATION (6) |
| 8 | TYPE 1 | 8 | — | — | — | ← BACKWARD OPERATION (5) |
| 9 | TYPE 4 | 9 | — | — | 5 | ← BACKWARD OPERATION (4) |
| 10 | TYPE 5 | 10 | — | — | — | ← BACKWARD OPERATION (3) |
| 11 | TYPE 5 | 13 | — | — | — | ← BACKWARD OPERATION (2) |
| 12 | TYPE 2 | 14 | POSITION [1] | — | — | ← BACKWARD OPERATION (1) |

ROBOT CONTROL APPARATUS WITH FUNCTION FOR ROBOT BACKWARD OPERATION

BACKGROUND OF THE INVENTION

1. Field of the Invention

The present invention relates to a robot control apparatus, and more particularly, to a robot control apparatus having a backward operation function for operating a robot to retrace a history of program execution.

2. Description of Related Art

A robot control apparatus has a function called a backward operation function as one of general functions thereof. This function of control is in a contrast to a forward operation function for operating a robot by reading an operation program forward, and is used for operating a robot to retrace the forward operation.

For example, the backward operation function is used when it is necessary to return the robot to an intermediate position or an initial position on a taught path so as to confirm the taught path or modify taught positions in a teaching operation, or when it is necessary to retract the robot which has been interfered and stopped in emergency from the interfered position.

The conventional backward operation function is, however, associated with the functional limitations mentioned below.

(1) In the backward operation, only motion commands are executed, and no consideration is given to motions involving input/output of external signals. For example, when the backward operation function is activated with respect to a forward operation including a closing (or an opening) action of a hand or a spot gun by an output signal to outside, an opening (or a closing) action to return the hand or the spot gun to the original state is not performed.

It is therefore necessary for an operator to separately carry out an operation for returning (opening or closing) the hand or the spot gun in the middle of the backward operation. If the operator omits to perform the returning operation or the returning motion is incomplete. (e.g, the hand or the spot gun is half-open), an interference may possibly be caused.

(2) If a branch command is executed during a forward operation, a backward operation which does not exactly correspond to the execution history is performed. Namely, according to the conventional backward operation function, a set of commands written in the operation program for the forward operation are simply executed in reverse order. Accordingly, in the case where the backward operation function is activated after a branch command is executed during a forward operation, a command that was skipped because of the branch command and was actually not executed (command which is not in the forward operation history) is executed during the backward operation.

The robot can therefore move to a position unexpected to the operator during the backward operation. To avoid this, the operator has to suspend the backward operation at a position immediately following the branch command, manually move the robot to a position immediately preceding the branch command, and then to restart the backward operation, thus requiring complicated operation.

(3) It is not possible to teach a backward mode executable program which is prepared specially for backward operation to be executed only during backward operation, and thus to start/execute such a backward mode executable program at a predetermined stage in the process of backward operation.

For example, it is difficult to cause the robot to automatically take a "roundabout course from a certain robot position to the next robot position (immediately preceding position) via another robot position" only during backward operation.

(4) Similarly, it is not possible to teach a command to be executed only during backward operation (hereinafter referred to as backward mode dedicated command), and thus to execute such a backward mode dedicated command at a predetermined stage in the process of backward operation. For example, it is difficult to cause the robot to output a predetermined signal to the outside before the movement thereof from a certain robot position to the next robot position (immediately preceding position) only during backward operation.

(5) In connection with the problem that motions involving the input/output of external signals are not taken account of during backward operation, the output states of commands (hereinafter referred to as I/O commands) that dominate over the states of external devices during backward operation can not be selectively specified (e.g., specification of hand open state) at liberty.

(6) Since motions involving computation of register values are also not taken into account during backward operation, backward operation entailing restoration of register values cannot be executed.

BRIEF SUMMARY THE INVENTION

One object of the present invention is to provide a robot control device with a backward operation function, which device also takes into account motions of cooperative devices involving the input/output of external signals, such as an opening/closing motion of a hand or a spot gun. Another object of the present invention is to provide a robot control device with a backward operation function whereby, even in the case where a branch command is executed during forward operation, backward operation based on accurate execution history can be performed taking such a branch command into account.

Further, the present invention provides a robot control device capable of executing a backward mode executable program or command in combination when the backward operation function is activated, provide a robot control device permitting the output states of I/O commands to be specified, and to permit a backward operation entailing restoration of register values to be carried out.

A robot control device according to the present invention includes a first storing means for storing a operation program including at least one statement for specifying an operation of a robot and at least one statement for specifying an operation of a cooperative device; forward operation processing means for performing processing of operating the robot and the cooperative device forward in accordance with the operation program; second storing means for storing history data of the forward operation of the robot and the cooperative device when the forward operation processing is performed; and backward operation processing means for performing backward operation processing based on the history data stored in the second storing means.

The backward operation processing means performs processing of operating the robot backward so that a history of the forward operation of the robot is traced backward, or preferably, processing of operating both the robot and the cooperative device backward so that the history of the forward operations of the robot and the cooperative device is traced backward.

In the case where an input/output command involving the input/output of a signal determining the status of a cooperative device such as a robot hand, a conveyor or the like is included in at least one statement for specifying the operation of the cooperative device, the execution history data includes data indicative of a status of such an external device before the status of the device changes in response to forward operation. Then, based on the data indicative of the status before change, the backward operation processing is performed such that the status of the external device is restored.

In connection with the restoration of the status of the external device during the backward operation processing, however, it is preferable to provide means for selectively invalidating the restoration.

In the case where a computation command is included in at least one statement for specifying the operation of the cooperative device, the history data includes data indicative of a computation value before it changes in response to the forward operation, and based on the data indicative of the value before change, the backward operation processing is performed so that the computation value is restored.

Where the operation program includes a backward operation dedicated command to be executed only during backward operation, the history data includes data of the backward operation dedicated command, and during backward operation, the backward operation dedicated command is executed in accordance with the data of the backward operation dedicated command.

Further, in the case where the operation program includes a start command to start a subprogram which includes a backward operation dedicated command to be executed only during backward operation, the history data includes data of the subprogram start command, and during backward operation, the subprogram is executed in accordance with the data of the subprogram start command.

Needless to say, it is preferable that one of continuous mode and step mode is selectable for the execution of the backward operation. Also, to secure the safety of the operator, the operator's attention is preferably called when the backward operation is performed.

BRIEF DESCRIPTION OF DRAWINGS

FIG. 4 is a diagram showing an arrangement of an execution history table;

FIG. 7 is a schematic diagram of a operation program for forward and backward operations;

FIG. 13 is a diagram showing the correspondence of the written state of the execution history table to a backward operation process;

DETAILED DESCRIPTION OF PREFERRED EMBODIMENTS

Figure 1:
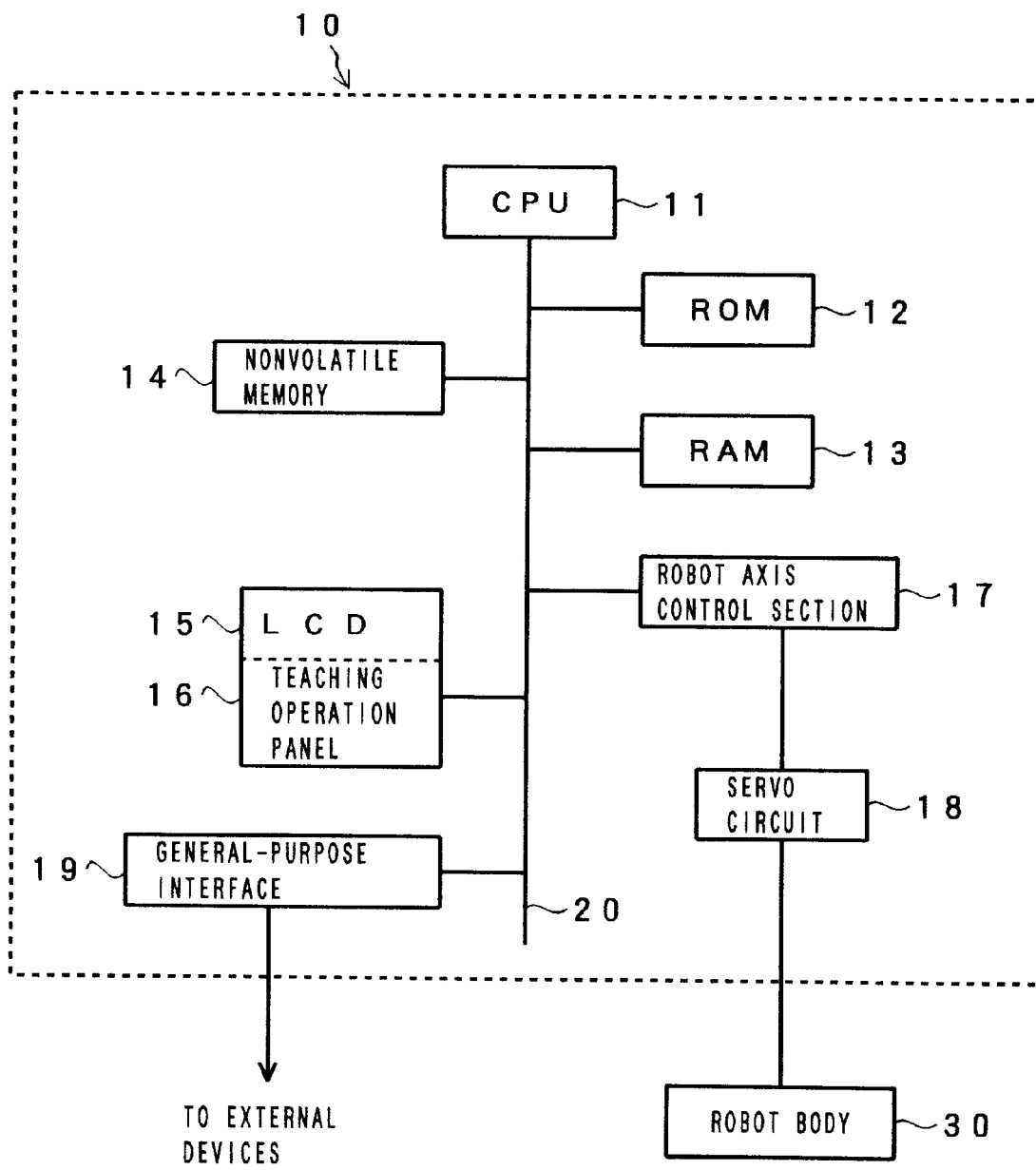
FIG. 1 is a block diagram showing the arrangement of a principal part of a robot control apparatus according to an embodiment of the present invention.

FIG. 1 shows an arrangement of a principal part of a robot control apparatus according to an embodiment of the present invention in the form of a block diagram.

In FIG. 1, a robot control apparatus 10 has a central processing unit (CPU) 11 which is connected to a memory 12 in the form of ROM, a memory 13 in the form of RAM, a nonvolatile memory 14 in the form of a CMOS etc., a teaching operation panel 16 with an LCD (liquid crystal display) 15, a robot axis control section 17 for controlling individual axes of a robot, and a general-purpose signal interface 19 connected to external devices (such as a hand, a conveyor, a workpiece box changer, a spot gun, an alarm lamp, a buzzer and an off-line programming device, which are not shown) via a bus 20. The robot axis control section 17 is also connected to a robot body 30 via a servo circuit 18.

The ROM 12 stores various programs to be executed by the CPU 11 to control the robot 30 as well as the robot control device 10 itself. The RAM 13 is a memory used for temporary storage of data and for computation. The non-volatile memory 14 is used to store various parameter set values and program data manually inputted from the teaching operation panel 16 or inputted by off-line through the interface 19.

The aforementioned arrangement is basically identical with that of a conventional robot control apparatus; however, the nonvolatile memory 14 stores program data necessary for performing a backward operation function according to characterizing features of the present invention and has a required buffer area, registers, etc. set therein. In the following, processes relating to the backward operation function will be outlined and then explained in detail with reference to a specific example of operation program.

[1] Modes (Continuous/Step Modes) of Backward Operation and Outline of Operation Flow The backward operation function is a function in relation to a forward operation which is performed by reading a program forward, and includes a continuous mode and a stepwise mode as modes for execution. The former is a mode in which history data about the forward operation is continuously and automatically read backward to achieve successive backward operation. When the backward operation function is activated in continuous mode, the backward operation of the robot is continuously performed until the beginning of the history data or the end of a retrace range specified by the operator is reached, unless a command to suspend the execution of backward operation is input or an alarm is output in the middle of the movement.

By contrast, the latter is a mode in which the history data is executed backward step by step when receiving a backward operation continuing command from the operator. Accordingly, the backward operation of the robot is not continued unless the command is inputted step by step.

Figure 2:
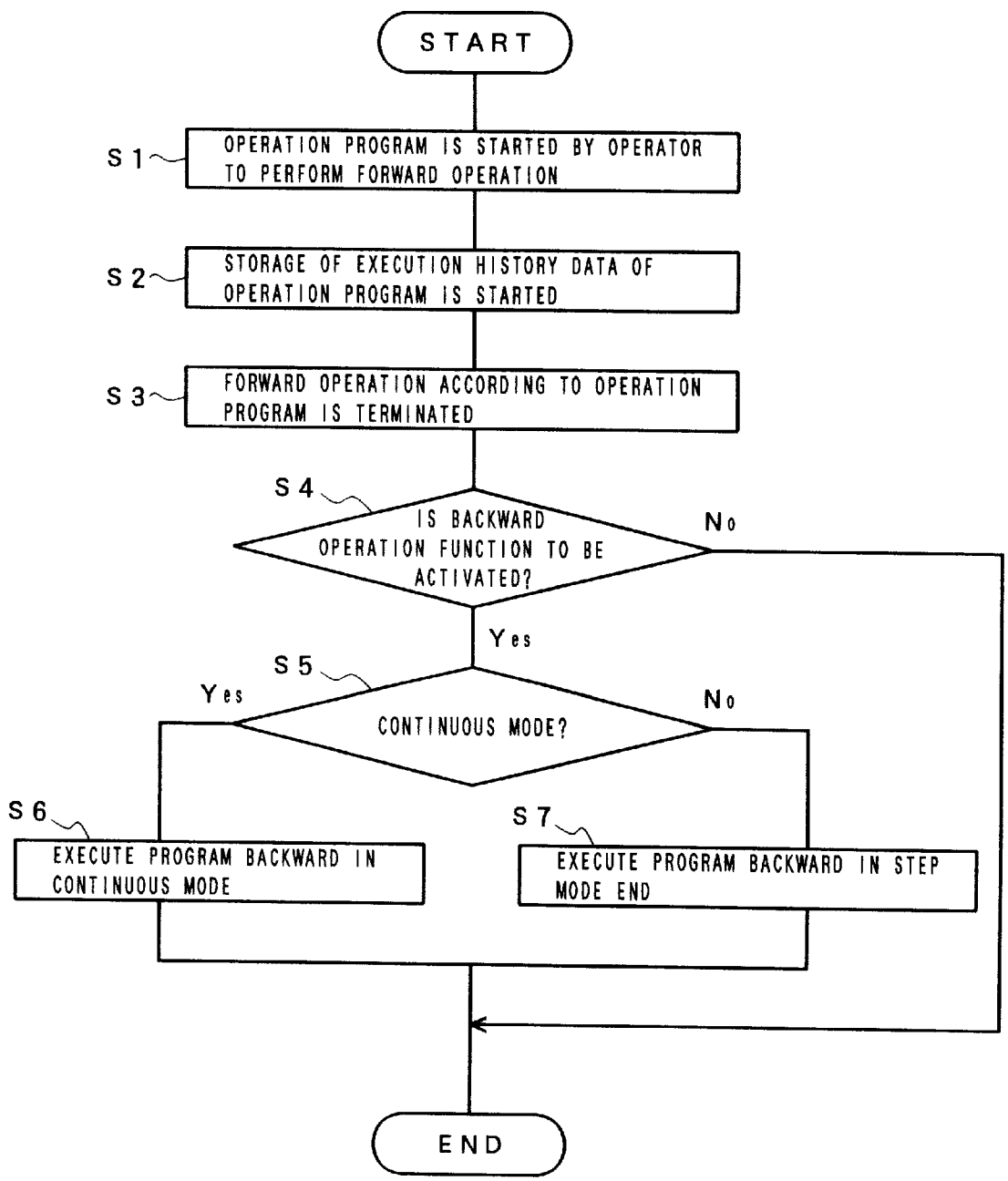
FIG. 2 is a flowchart schematically showing the flow of operations and processing relating to a backward operation function.

FIG. 2 is a flowchart schematically showing a flow of operations and processing relating to the backward operation function, taking account of the aforementioned matter as well as execution of a backward mode executable program/command and selective specification of the output states of I/O commands.

First, the operator specifies and starts a program for the robot as in the case of a normal playback operation, whereupon execution of the program is started (Step S1). Needless to say, the processing executed in this case is a forward operation. The motion of the robot is started at the time of an output of a motion command.

Following the start of the forward operation, a process of writing execution history data in the memory is started (Step S2). The execution history data written in the memory may include data other than that relating to actually executed commands, as described later referring to a specific example.

After the forward operation according to the program is terminated (Step S3), when the CPU 11 confirms an operator's intention to perform the backward operation ("Yes" in Step S4) based on an operator's manual input or an external signal input, it is determined whether or not the backward operation is to be performed in the continuous mode or the step mode (Step S5), and then a backward operation processing is executed in the continuous or step mode (Step S6 or S7).

The forward operation may be terminated in Step S3 at an intermediate stage of the forward operation according to the program. Also, the position (row) on the program at which the forward operation is terminated may not necessarily be the same as the position (row) on the program from which the backward operation is to be started (for example, the backward operation may be started from a 15th row after execution of the forward operation by 1st to 20th rows). If it is confirmed by the CPU 11 that the operator has no intention of performing backward operation ("No" in Step S4), the processing is of course terminated.

[2] Outline of Process of Writing Execution History Data Into Memory

During the forward operation, the program is read line by line and executed. Each time one line of command is executed, execution history data is written in the memory. For commands that are not executed during forward operation such as backward mode dedicated commands, however, corresponding history data is written without executing such commands during the forward operation. In the writing process, a type of the executed command is discriminated and then table data is created in the form of a combination of command-type discriminative data and related history data.

Figure 3:
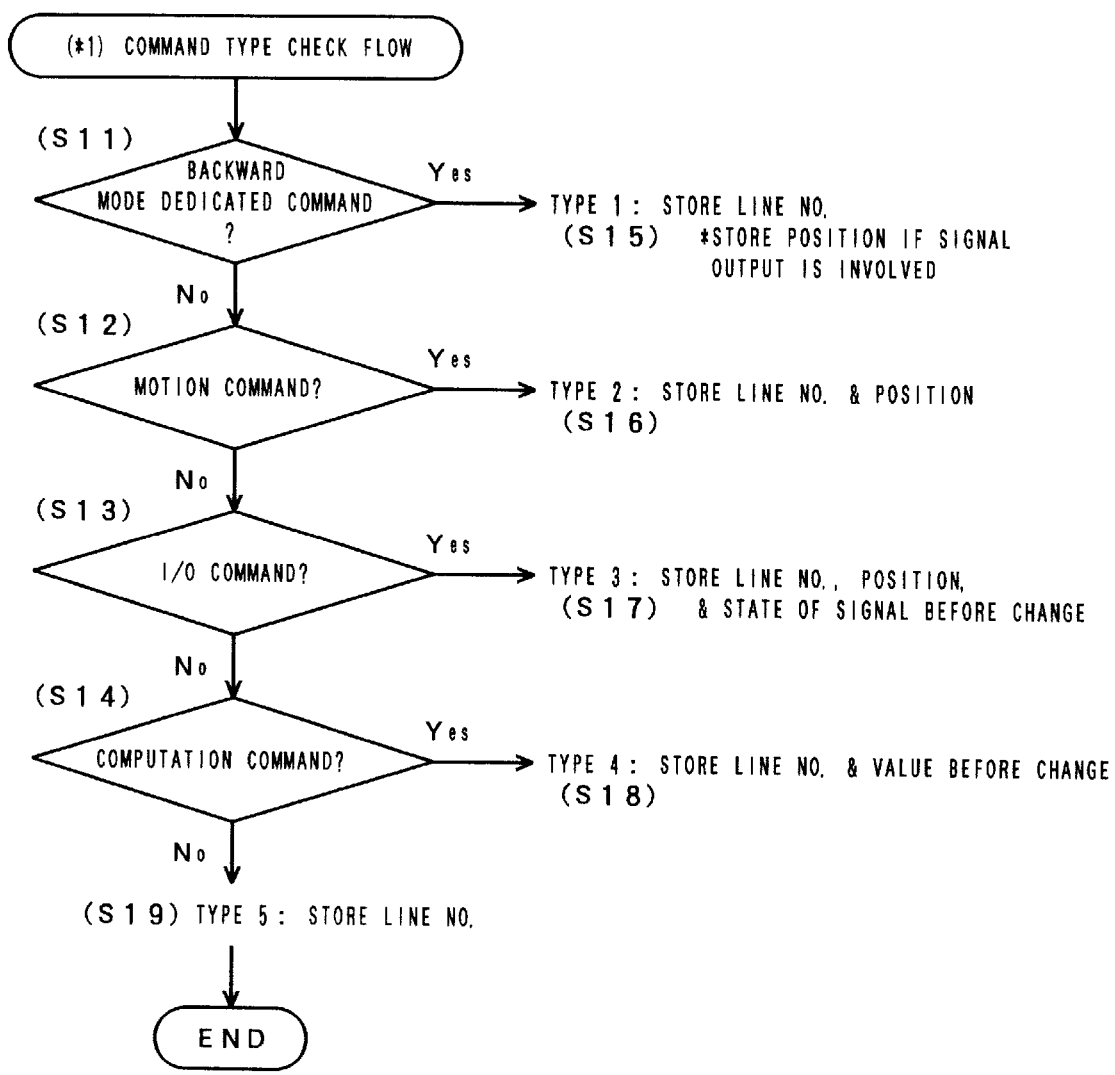
FIG. 3 is a flowchart schematically showing a command type checking process.

In this embodiment, table data "(*2) execution history table" as shown in FIG. 4 is successively created through execution of the process "(*1) command type check flow" shown in FIG. 3. Symbols (*1), (*2), etc. are used for ease of distinguishment in the drawings and related explanation to follow.

Five command types discriminated in Steps S11 to S14 of the (*1) command type check flow are defined as described below. Steps S15 to S19 are executed depending on the decisions made in Steps S11 to S14. As seen from execution history write rules shown in the figure next to the respective Steps S15 to S19, history data to be written slightly varies depending on the command type dedicated.

Type 1 (backward mode dedicated command): A command specifying execution only during backward operation. This type of command may, however, be written in a program as a command accompanying a statement which is to be executed during forward operation, as described later (see line 7 of a main program shown in FIG. 7). Namely, the term "backward mode dedicated command" is used herein to signify a "line of command described by such a statement as to include a command which is executed only during backward operation".

Type 2 (motion command): A Command relating to motion of the robot itself (part driven through a robot axis).

Type 3 (I/O command): A Command specifying input/output with respect to external devices such as the hand.

Type 4 (computation command): A Command specifying computation such as increment/decrement of register values.

Type 5 (other commands): A Command which does not belong to any of Types 1 to 4, such as a branch command.

To discriminate the types of commands, a method may be employed wherein the individual commands are in advance labeled respective command type codes and the discrimination is made by reading the command type codes. As an alternative, the discrimination may be made by identifying terms unique to the respective command types. For example, Type 1 may be identified by the term "BACKWARD", Type 2 by "POSITIONING", "SMOOTH", etc., Type 3 by "SDI", "SDO", etc., Type 4 by "REG", "COUNT", etc., and the commands not including these terms may be judged to be Type 5.

As shown in FIG. 4, in this embodiment, a buffer for writing the execution history data therein has columns 1 to 5, in which are respectively written the result of command type discrimination, the row number concerned, the position of the robot, the state of I/O signal before execution of the command, and the value of a target of computation command (e.g., register) before execution of the computation command, in accordance with the execution history write rules. The figure shows, by way of example, the state in which the writing of data up to row 10 has been completed. The manner of how the execution history data is created will be described later in detail.

[3] Outline of Backward Operation Process When backward operation is performed, the data written in the (*2) execution history table is read row by row backward (i.e., upward in FIG. 4), and in accordance with the type of the read command, the necessary process is executed. An outline of the process is shown in "(*3) command type-dependent execution flow" of FIG. 5. It is possible to specify from which row in the (*2) execution history table the backward reading is to be started.

The command type discriminations in Steps S21 to S24 of the (*3) command type-dependent execution flow can be made immediately based on the column 1 of the read row. In Steps S25 to S29, processes for the backward operation, outlined below, are executed in accordance with the result of discrimination.

1. Type 1 (backward mode dedicated command): Since this is a command specifying execution only during backward operation, a separately taught backward mode dedicated command is read and executed. If the read command is a command to output a signal to an external device (e.g., hand), however, such a signal output command is executed after completion of the motion (robot backward operation) to the stored position (if the signal is output before the robot movement according to a previously read motion command is completed, then the backward operation fails to follow the right order).

2. Type 2 (motion command): Motion (robot backward operation) to the stored position is carried out.

3. Type 3 (I/O command): After the motion (robot backward operation) to the stored position is completed, the next process is executed in accordance with the setting (valid/invalid setting) as to the specification of inversion of the I/O signal. The (valid/invalid) setting of the signal inversion specification can be changed by means of variable setting of the system (*4).

Figures 5, 6:
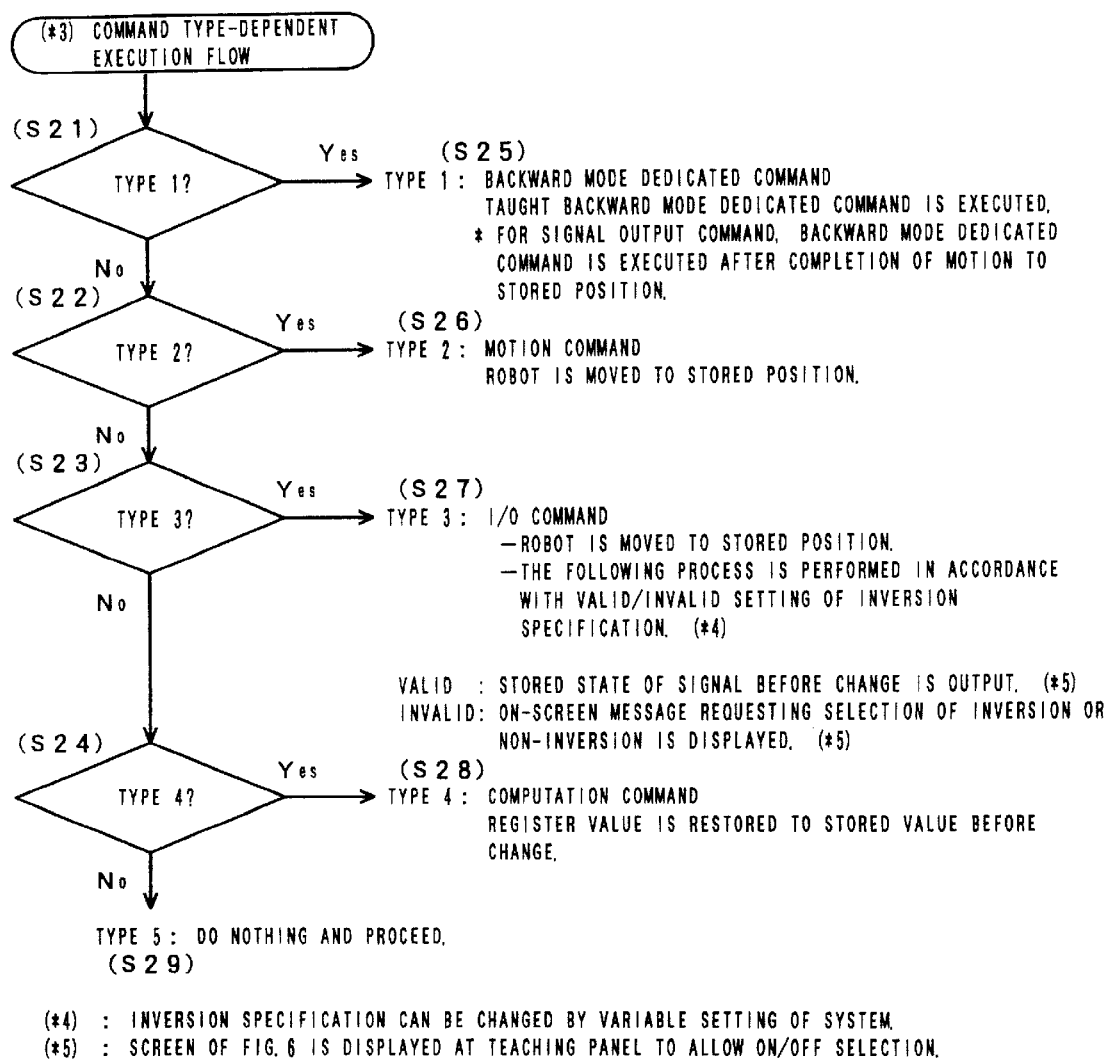
FIG. 5 is a flowchart schematically showing a command type-dependent execution process.
FIG. 6 is a diagram showing a screen displaying an I/O selection message.
Figure 8:
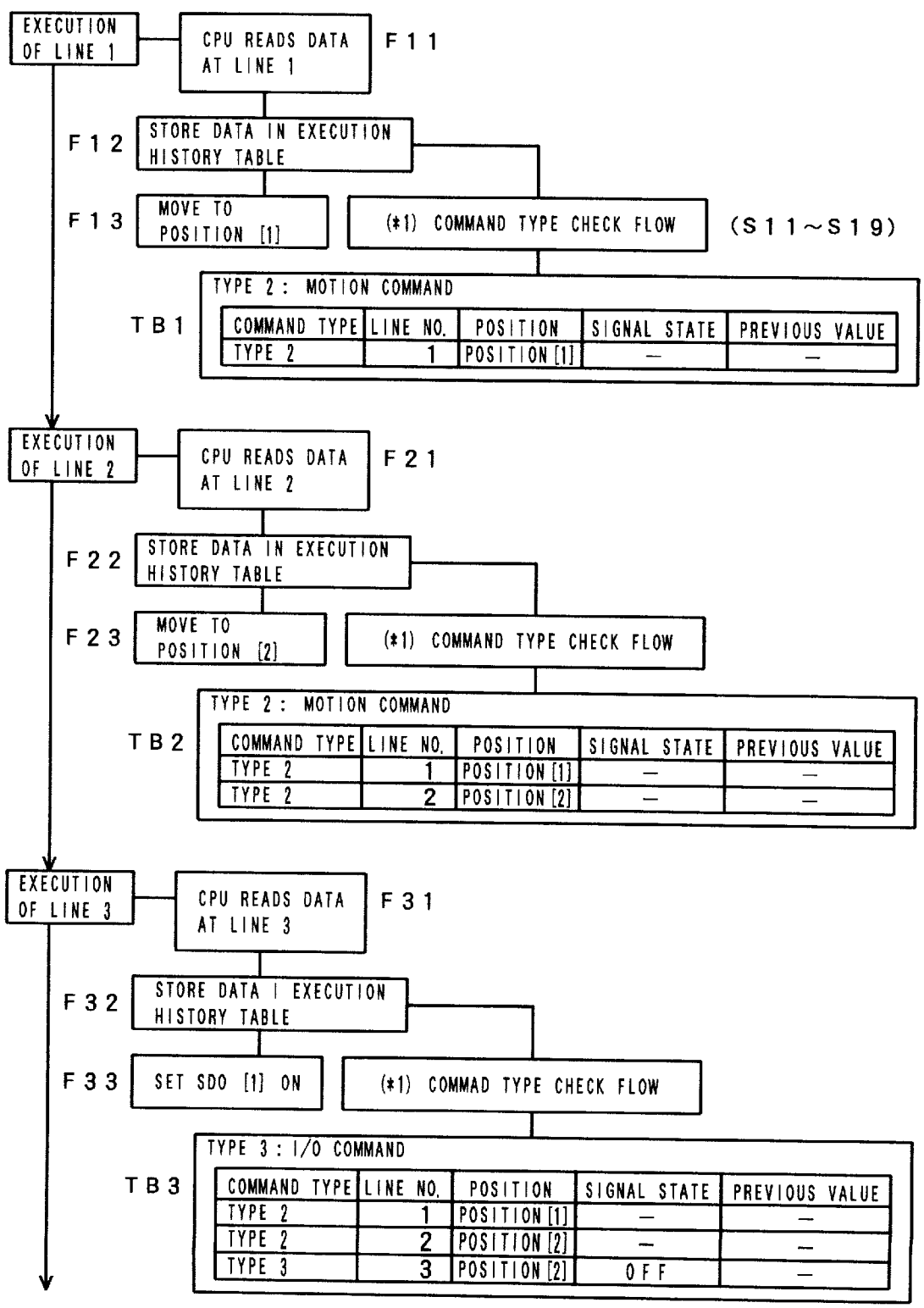
FIG. 8 is part of a flowchart showing a forward operation process flow according to the operation program, together with the status of writing of execution history data.
Figure 9:
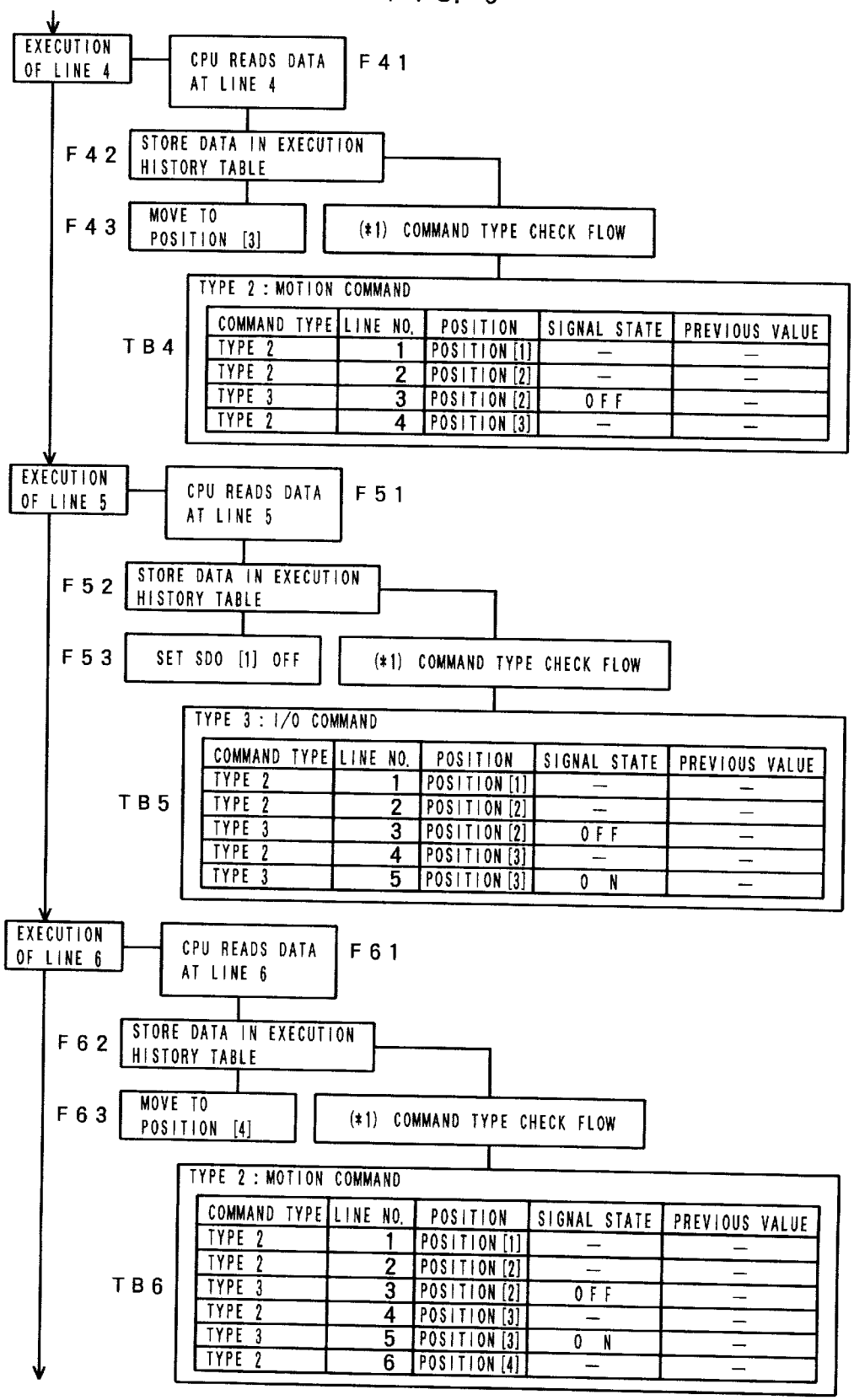
FIG. 9 is a continuation of the flowchart of FIG. 8.
Figure 10:
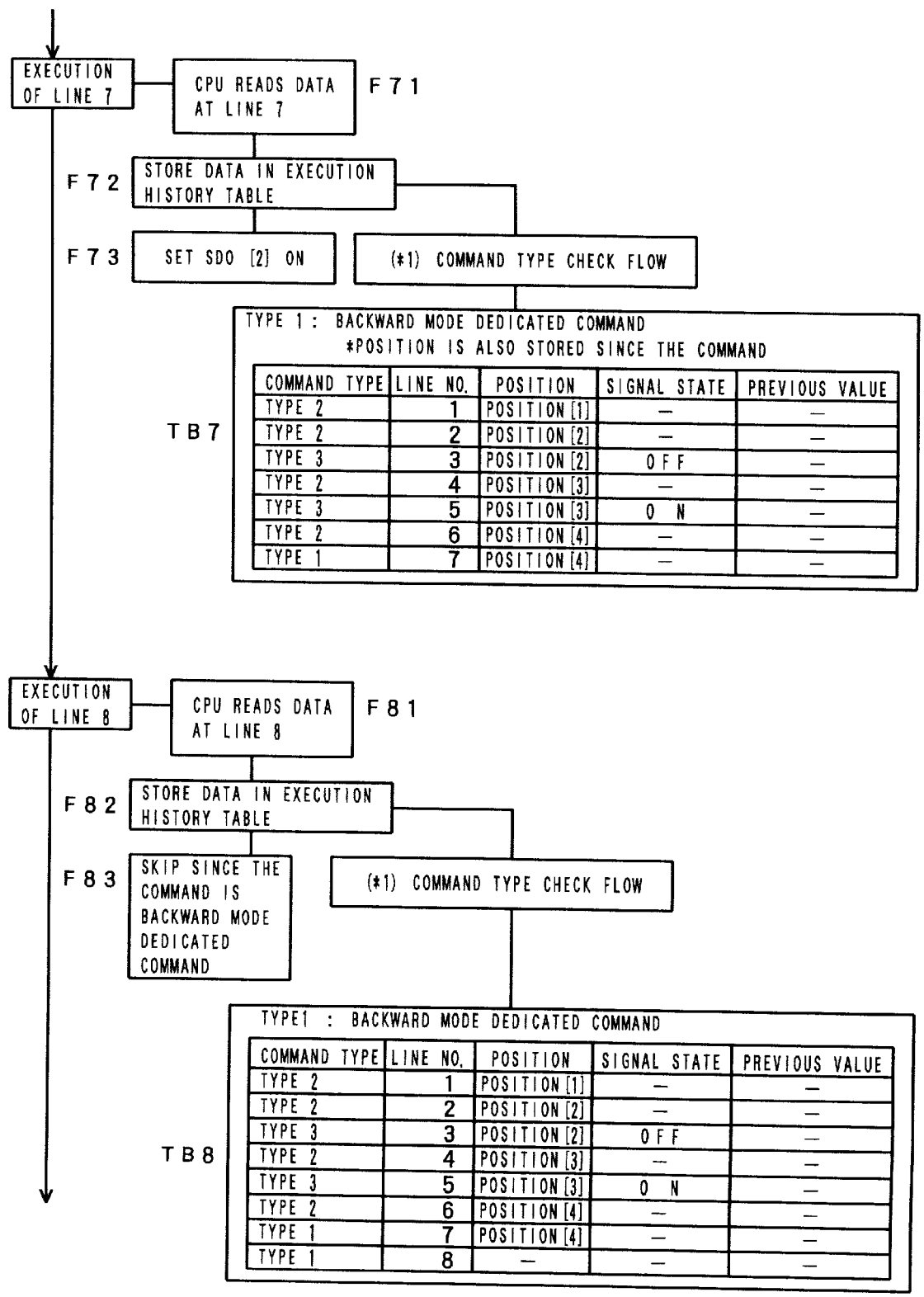
FIG. 10 is a continuation of the flowchart of FIG. 9.
Figure 11:
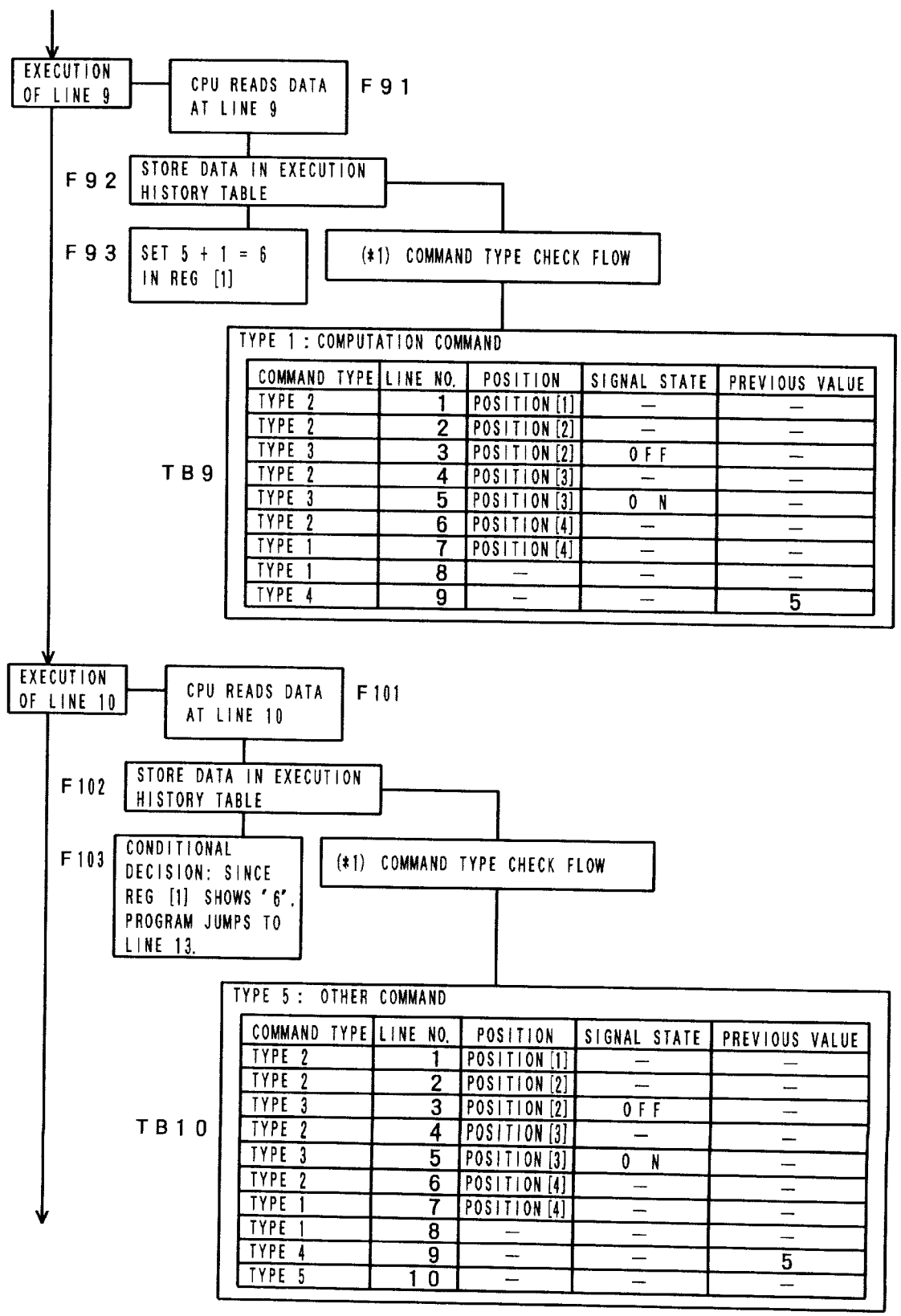
FIG. 11 is a continuation of the flowchart of FIG. 10.

If the set inversion specification is "valid", the stored state of signal before change is read from the column 4 in the (*2) execution history table and output. On the other hand, if the set inversion specification is "invalid", an (*6) I/O selection message shown in FIG. 6 is displayed on the screen of the LCD 15 of the teaching panel 16, thus requesting the operator to select ON or OFF (*5). In the illustrated example, ON is selected.

4. Type 4 (computation command): The stored value before change is read from the column 5 in the (*2) execution history table and output.

5. Type 5 (other commands): The next process is executed without carrying out anything. Namely, the next row (the row immediately above) in the (*2) execution history table is read and the register value is restored to this value.

[4] Example of Operation Program and Operation Performed During

Forward Operation

In the following, a program shown in FIG. 7 is taken as an example. This program is concerned with a task whereby a workpiece fed to a certain position is grasped with the robot hand and placed on a conveyor to be packed in a box. Although an outline of the task is also shown in FIG. 7, a supplementary explanation of the task will be given with reference to the schematic diagrams of FIGS. 18a–18e.

Figure 18A:
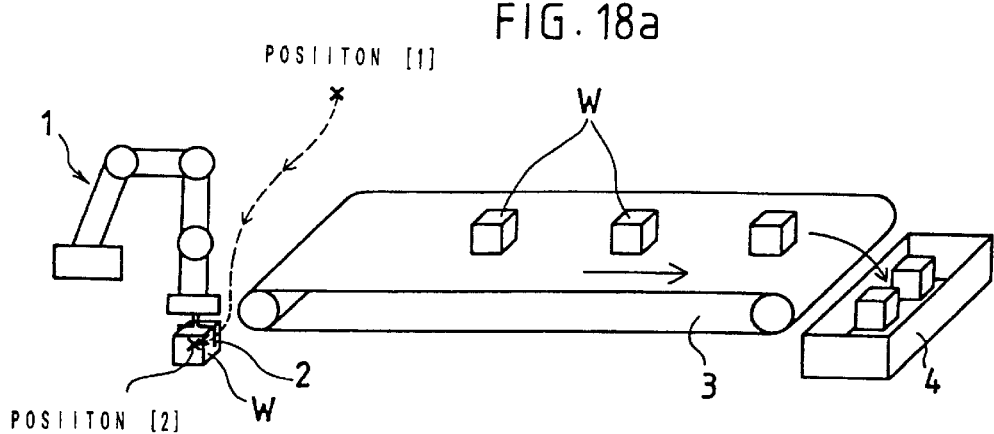
FIGS. 18a–18c are schematic diagrams of the progress of operation during a forward operation.

First, as shown in FIG. 18a, a robot 1 is moved from a standby position (not shown) to POSITION [1] (origin position on a motion path) (line 1). The robot is then moved to POSITION [2] corresponding to a supply position (grasping position) of a workpiece W (line 2), and a hand 2 is closed to thereby grasp the workpiece W (line 3; SDO [1] ON).

Figure 18B:
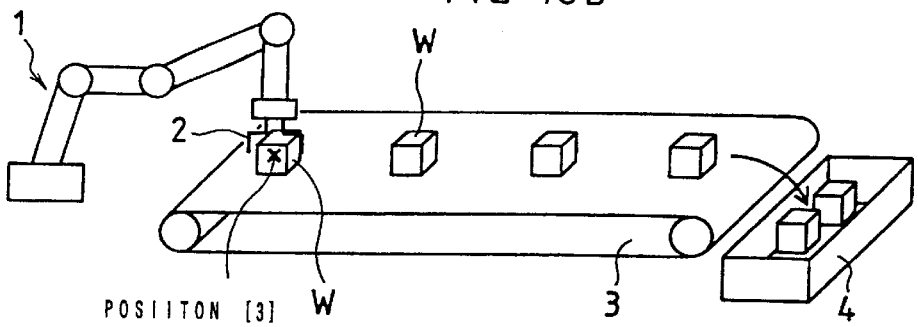

Subsequently, as shown in FIG. 18b, with the workpiece W grasped, the robot 1 is moved to POSITION [3] which is a placement position above a conveyor 3 (line 4). The hand 2 grasping the workpiece W is then opened to place the workpiece W on the conveyor 3 (line 5; SDO [1] OFF).

Figure 18C:
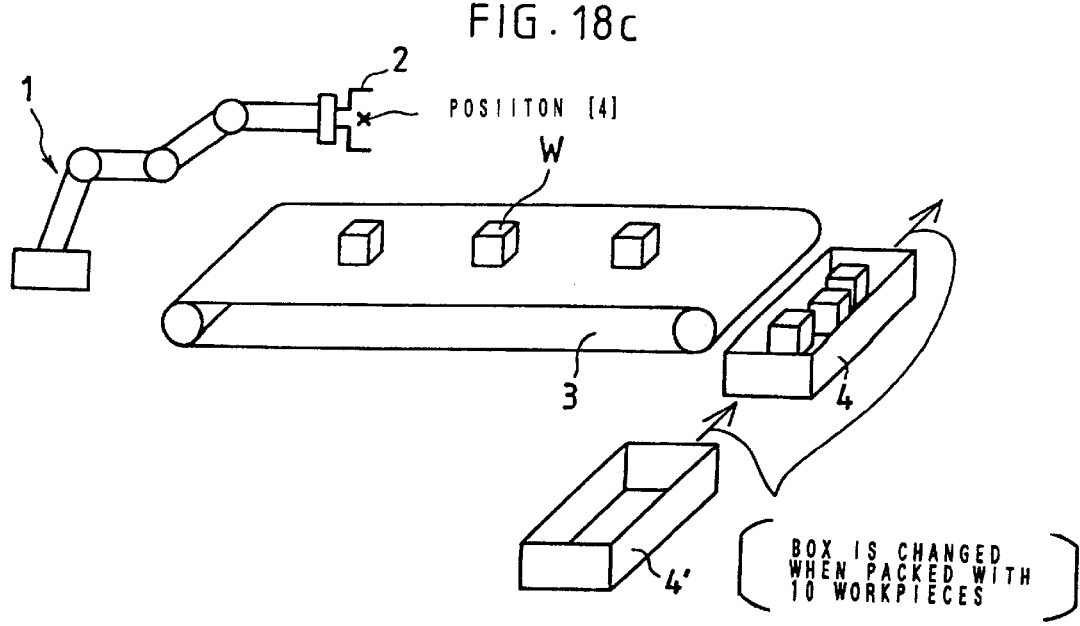

Further, as shown in FIG. 18c, the robot 1, which has completed the placement of the workpiece W on the conveyor 3, is moved to POSITION [4] which is a retraction position (line 6). Then, SDO [2], which is a forward travel signal for the conveyor 3, is set ON to cause the conveyor to move forward for a predetermined distance (line 7). Line 7 includes a command (parenthesized command) which is to be executed only during backward operation, and thus the command type thereof is categorized as the backward mode dedicated command. During backward operation, SDO [2] is set OFF (travel of the conveyor is stopped) in accordance with the parenthesized command, as described later. The next line 8 is a backward mode dedicated command which does not include a command to be executed during forward operation, and accordingly, the task does not progress. Further, the register value is incremented by "1" so as to store data that one workpiece W has been conveyed (line 9).

Line 10 and the following lines are concerned with a process for changing the workpiece box 4 with a new one 4' when the workpiece box 4 is filled with workpieces (in this example, ten workpieces). Specifically, when the register value shows a saturation value of "10", it is judged that the workpiece box 4 is filled. If "10" is not yet reached by the register value, the program jumps to LABEL [1] (line 10, line 13), and the robot 1 is returned to POSITION [1] (line 14).

When the task shown in FIGS. 18a–18c has been repeated ten times, the register value reaches "10"; therefore, the program proceeds from line 10 to line 11, whereupon the register value is initialized to "0". Further, SDO [3], which is a change signal for the workpiece box 4, is set ON, whereby a workpiece box changing mechanism, not shown, is operated to replace the workpiece box 4 with the new one 4' (line 12). After the change of the workpiece boxes is completed, the program proceeds to LABEL [1] (no task is performed) (line 13), and then the robot 1 is returned to POSITION [1] (line 14).

A subprogram called only during backward operation by the backward mode dedicated command at line 8 includes a command whereby SDO [4], which is a backward travel signal for the conveyor 3, is set ON, as shown in the lowermost part of FIG. 7, to cause the conveyor to move backward for the predetermined distance. Operations during backward operation including the execution of this command will be described later. In the following, the part (lines 1 through 14) of the program shown in FIG. 7 except the subprogram is referred to as the main program.

[5] Details of Forward Operation Process Flow

FIGS. 8 through 12 are flowcharts illustrating a process flow of forward operation according to the main program, together with the status of the execution history data writing. The process flow will be hereinafter explained in order. In the following, it is assumed that the register value of REG [1] (the index value indicative of the number of workpieces contained in the workpiece box) at the start of the processing cycle is "5", by way of example.

(FIG. 8)

[Execution of Line 1]: Reading of the program data (F11), data write into the execution history table (F12) and execution of the command (F13) are performed. The writing process with respect to the execution history table is carried out in accordance with the aforementioned (*1) command check flow (see FIG. 3: S11–S19). This is the case with execution of each of the lines described below; therefore, in the following, repeated explanation and illustration of "S11–S19" in the figures are omitted.

The command at line 1 is a robot motion command to move the robot to POSITION [1]. Accordingly, data "TYPE 2", "1", and "POSITION [1]" are written in columns 1 to 3 at the first row of the table, respectively, and columns 4 and 5 are left blank (TB1). Executing the command at this line moves the robot to POSITION [1] (approach position for grasping a workpiece).

[Execution of Line 2]: Similarly to line 1, reading of the program data (F21), data write into the execution history table (F22) and execution of the command (F23) are performed. Since the command at line 2 is a robot motion command to move the robot to POSITION [2], data "TYPE 2", "2" and "POSITION [2]" are respectively written in columns 1 to 3 at the second row of the table, while columns 4 and 5 are left blank (TB2). Execution of the command at this line moves the robot to POSITION [2] (workpiece grasping position).

[Execution of Line 3]: Like lines 1 and 2, reading of the program data (F31), data write into the execution history table (F32) and execution of the command (F33) are performed. In accordance with the (*1) command check flow, the writing process with respect to the execution history table is performed. The command at line 3 relates to an I/O signal and is a command to switch SDO [1] from OFF to ON. Accordingly, data "TYPE 3", "3" and "POSITION [2]" are respectively written in columns 1 to 3 at the third row of the table, while data indicative of "OFF" is written in column 4 as a signal state before change. Column 5 is left blank (TB3). As a result of the execution of the command to set SDO [1] ON, the hand is closed (workpiece W is grasped).

(FIG. 9)

[Execution of Line 4]: Reading of the program data (F41), data write into the execution history table (F42) and execution of the command (F43) are performed. Since the command at line 4 is a robot motion command to move the robot to POSITION [3], data "TYPE 2", "4" and "POSITION [3]" are respectively written in columns 1 to 3 at the fourth row of the table, while columns 4 and 5 are left blank (TB4). Executing the command at this line moves the robot grasping the workpiece W to POSITION[3] (conveyor placement position).

[Execution of Line 5]: Reading of the program data (F51), data write into the execution history table (F52) and execution of the command (F53) are performed. The command at line 5 relates to an I/O signal and is a command to switch SDO [1] from ON to OFF. Accordingly, data "TYPE 3", "5" and "POSITION [3]" are respectively written in columns 1 to 3 at the fifth row of the table, while data indicative of "ON" is written in column 4 as a signal state before change. Column 5 is left blank (TB5). As a result of the execution of the command to set SDO [1] OFF, the hand is opened (the workpiece W is placed on the conveyor 3).

[Execution of Line 6]: Reading of the program data (F61), data write into the execution history table (F62) and execution of the command (F63) are performed. The command at line 6 is a robot motion command to move the robot to POSITION [4]; therefore, data "TYPE 2", "6" and "POSITION [4]" are respectively written in columns 1 to 3 at the sixth row of the table, while columns 4 and 5 are left blank (TB6). As a result of the execution of the command at this line, the robot, which has released the workpiece W onto the conveyor 3, moves to POSITION [4] (retraction position).

(FIG. 10)

[Execution of Line 7]: Reading of the program data (F71), data write into the execution history table (F72) and execution of the command (F73) are performed. The command at line 7 is categorized as Type 4 (backward mode dedicated command), as mentioned above. However, since a command to set SDO[2] ON is included as a command to be executed during forward operation, SDO [2] is set ON (the conveyor 3 is moved forward) during the forward operation. Data "TYPE 1", "7" and "POSITION [4]" are written respectively in columns 1 to 3 at the seventh row of the table, while columns 4 and 5 are left blank (TB7).

[Execution of Line 8]: Reading of the program data (F81), data write into the execution history table (F82) and execution of the command (F83) are performed. The command at line 8 is categorized as backward mode dedicated command. Since the backward mode dedicated command at this line includes no command to be executed during forward operation, no substantial process is executed in Step F83 (skipped). Data "TYPE 1" and "8" are respectively written in columns A and 2 at the eighth row of the table, and columns 3 to 5 are left blank (TB8).

(FIG. 11)

[Execution of Line 9]: Reading of the program data (F91), data write into the execution history table (F92) and execution of the command (F93) are carried out. The command at line 9 is to perform addition in REG [1] and thus is categorized as Type 4, that is, computation command. Accordingly, data "TYPE 4" and "9" are written respectively in columns 1 and 2 at the ninth row of the table, and "5" is written in column 5 as the register value before the addition (in this example, "5" is assumed). Columns 3 and 4 are left blank (TB9). As a result of the execution of the command at this line, the index value indicative of the number of workpieces W conveyed (or contained in the workpiece box 4) is incremented by "1" to "6".

[Execution of Line 10]: Reading of the program data (F101), data write into the execution history table (F102) and execution of the command (F103) are performed. The command at line 10 is a branch command involving conditional decision based on REG [1], and therefore, is categorized as Type 5. Accordingly, data "TYPE 5" and "10" are respectively written in columns 1 and 2 at the tenth row of the table, and columns 3 to 5 are left blank (TB10). In Step F103, it is determined whether or not the register value has reached "10" (in this example, since the register value is "6", the result of the decision is Yes and the program jumps to LABEL [1]).

The line executed next is, therefore, line 13 with LABEL [1], and not line 11.

(FIG. 12)

[Execution of Line 13]: Reading of the program data (F131), data write into the execution history table (F132) and execution of the command (F133) are performed. The command at line 13 is a command relating to LABEL [1] specifying a destination of jump and thus is categorized as Type 5. Accordingly, data "TYPE 5" and "13" are written respectively in columns 1 and 2 at the eleventh row of the table, while columns 3 to 5 are left blank (TB13). In Step F133, confirmation of LABEL [1] alone is made.

[Execution of Line 14]: Reading of the program data (F141), data write into the execution history table (F142) and execution of the command (F143) are performed. The command at line 14 is a robot motion command to move the robot to POSITION [1]. Accordingly, data "TYPE 2", "14" and "POSITION [1]" are respectively written in columns 1 to 3 at the twelfth row of the table, while columns 4 and 5 are left blank (TB14). Executing the command at this line returns the robot to POSITION [1] (origin position on the motion path).

The above completes one cycle of forward operation process. The task performed includes placing one workpiece W on the conveyor 3, conveying the workpieces W, and putting one workpiece W into the workpiece box 4, as explained with reference to FIGS. 7 and 18*a*–8*c*. In this stage, the (*1) execution history table is in the state indicated by TB14.

The workpiece packing operation progresses as the aforementioned processing cycle is repeated, and if the register value reaches "10" (the workpiece box 4 is filled), the result of decision at Step F103 becomes No when line 10 is executed; in this case, the program makes no jump and lines 11 and 12 are executed, followed by execution of lines 13 and 14.

Like the process at each of the lines described above, also when line 11 is executed, reading of the program data (F11), data write into the execution history table (F112) and execution of the command (F113) are performed, though not illustrated in the form of flowchart. The command at line 11 is a command relating to initialization of REG [1] and thus is categorized as Type 4. Accordingly, data "TYPE 4" and "11" are respectively written in columns 1 and 2 of the table, while "10" is written in column 5 as the register value before initialization. Columns 3 and 4 are left blank.

Similarly, also when line 12 is executed, reading of the program data (F121), data write into the execution history table (F122) and execution of the command (F123) are performed. The command at line 12 is an I/O command to set SDO [3] ON, and thus the category thereof is Type 3. Accordingly, data "TYPE 3", "12" and "POSITION [4]" are respectively written in columns 1 to 3 of the table, and "OFF" is written in column 4 as the signal state before change. Column 5 is left blank. As previously mentioned, as a result of the execution of the command to set SDO [3] ON, the workpiece box 4 is replaced with a new empty workpiece box 4'.

[6] Details of Backward Operation Process Flow

The following is a detailed explanation of a process flow when the backward operation function is activated.

It is here assumed that when the backward operation function is activated, the system is in a state in which the processing cycle (one cycle) shown in FIGS. 8 through 12 has been completed. In general, the robot may be at any position. The register value is "6" because "1" was added to the value "5" retained at the start of the processing cycle.

Figure 12:
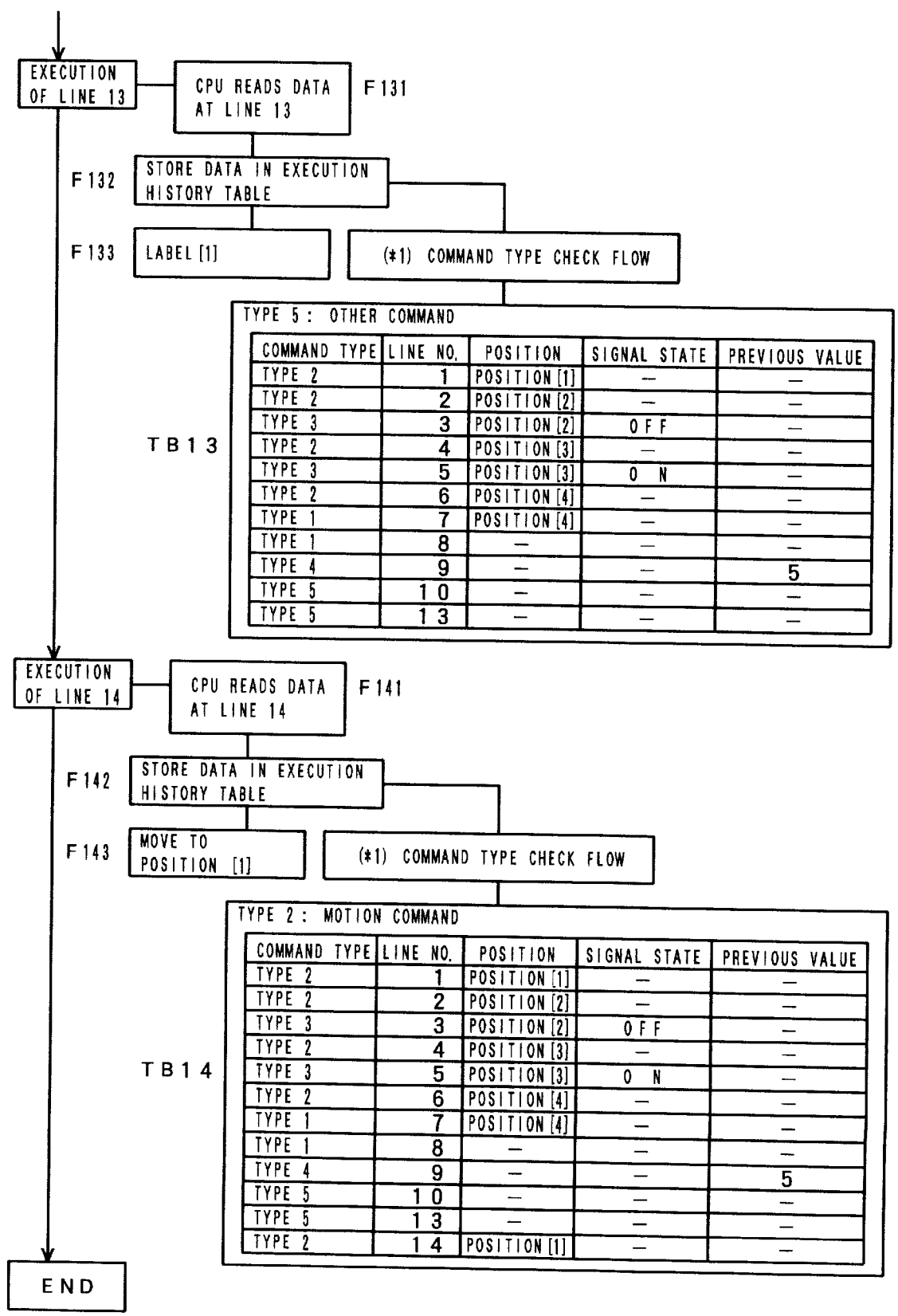
FIG. 12 is a continuation of the flowchart of FIG. 11.

Data has been written in the (*1) execution history table as indicated by (TB14) in FIG. 12. FIG. 13 shows the correspondence of the data written in the (*1) execution history table to "backward operation (1)" through "backward operation (12)" indicative of the progress of a backward operation process flow explained hereinafter. As seen from the figure, the backward operation process flow is executed by reading data so as to trace the execution history backward, that is, from the lowermost line upward.

FIGS. 14 through 17 are flowcharts similar to those of FIGS. 8 to 12, illustrating a process flow according to a program (main program+subprogram) for backward operation in this embodiment. The flowcharts will be now explained in order. Note, the "backward processing" used in the following explanation is not a narrow term restrictively indicating a process for backward operation of the robot itself, but a generic term representing a process of operations performed by the robot control device during backward operation, and may include the following processes:

1. Process for backward operation (such movement as to trace the forward operation path backward) of the robot itself.

2. Process for restoring the states of external signals to those before execution of corresponding I/O commands during forward operation (i.e., to the states before change). However, in the case where "invalid" is set for the inversion specification, the external signal state is directly specified.

Figure 14:
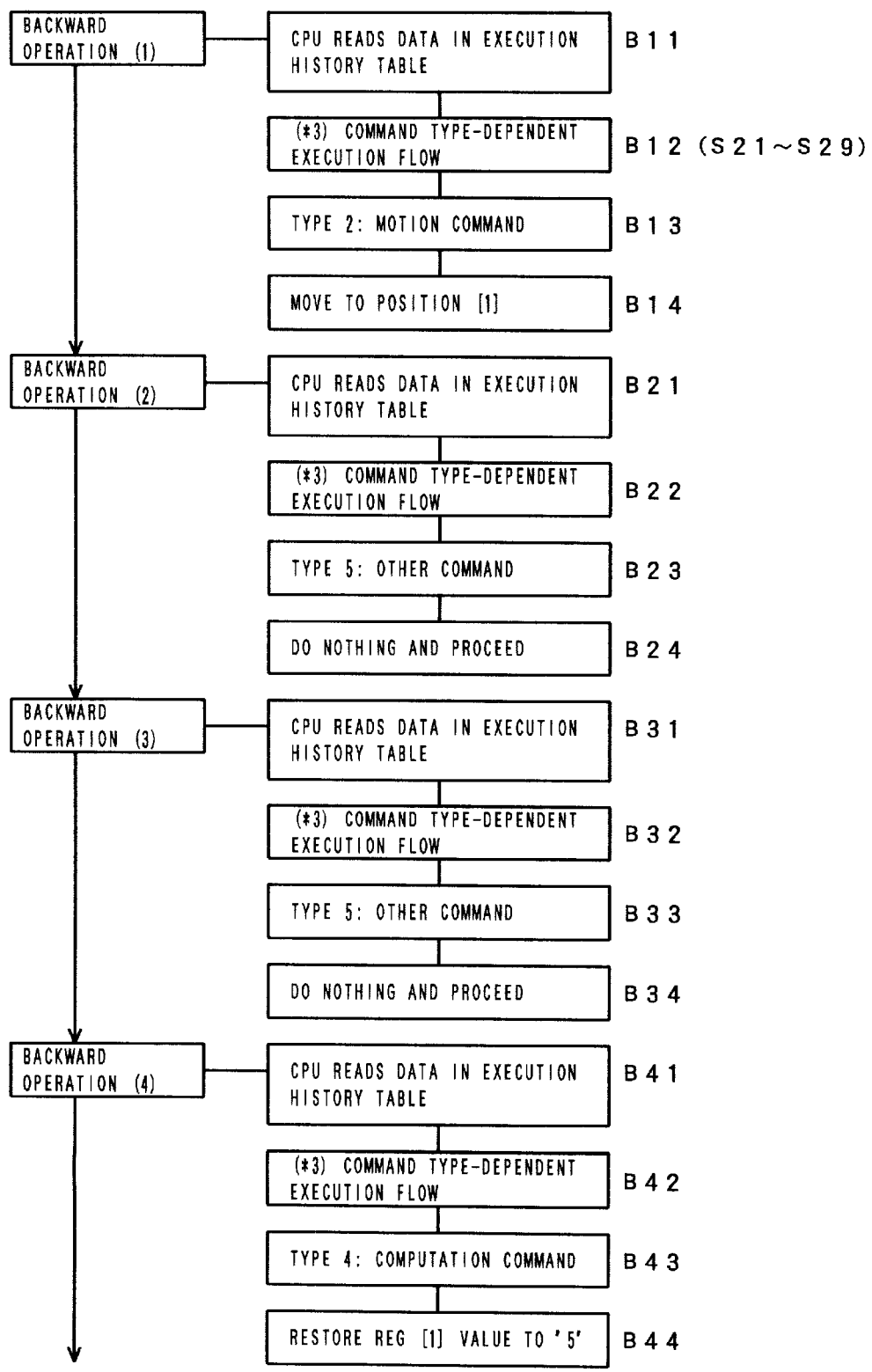
FIG. 14 is part of a flowchart of the backward operation process.

3. Process for restoring the computed values, such as the register value, to the states before execution of corresponding computation commands during forward operation (i.e., to the states before change). (FIG. 14)

[Backward Operation (1)]: Data in the execution history table is read (B11), and the process of (*3) command type-dependent execution flow (B12) is performed on the read data. Then, in accordance with the result (B13) of decision as to the command type (category), the backward process is executed (B14). The process of command type-dependent execution flow is executed in accordance with the aforementioned (*3) command check flow (see FIG. 5: S21–S29). This is the case with execution of each of the rows described below; therefore, in the following, repeated explanation and illustration of "S21–S29" in the figures are omitted.

The data read from the execution history table in this case are the data in columns 1 to 3 at the twelfth row. Accordingly, the result of the command type discrimination (B13) is Type 2 (motion command), and a process for moving the robot to POSITION [1] (origin position on the motion path) described in column 3 is performed (B14) as the backward process.

The data in column 2 is utilized to determine the condition for movement type (linear motion, circular motion, motion of each axis, etc.) and the like. An override for the backward operation is set separately. For the backward operation, in general, an override smaller than that applied to the forward operation is specified (the speed is reduced). These apply to the other backward operations of the robot described below, and therefore, in the following, repeated explanation is omitted.

[Backward Operation (2)]: Data in the execution history table is read (B21), and the process of (*3) command type-dependent execution flow (B22) is performed on the read data. Then, in accordance with the result of command type discrimination (B23), the backward process is performed (B24).

In this case, the data read from the execution history table are the data in columns 1 and 2 at the eleventh row, and thus the result of command type discrimination (B23) is Type 5 (other command). In the backward process, therefore, only advance to the next step is confirmed and no substantial change in the system status occurs (B24).

[Backward Operation (3)]: Data in the execution history table is read (B31), and the process of (*3) command type-dependent execution flow (B32) is performed on the read data. Then, in accordance with the result of command type discrimination (B33), the backward process is executed (B34).

The data read from the execution history table in this case are the data in columns 1 and 2 at the tenth row. Accordingly, the result of command type discrimination (B33) is Type 5 (other command), and the system status does not substantially change (B34), as in the case of the backward operation (2).

8 Backward Operation (4)]: Data in the execution history table is read (B41), and the process of (*3) command type-dependent execution flow (B42) is performed on the read data. Then, in accordance with the result of command type discrimination (B43), the backward process is performed (B44).

Figure 15:
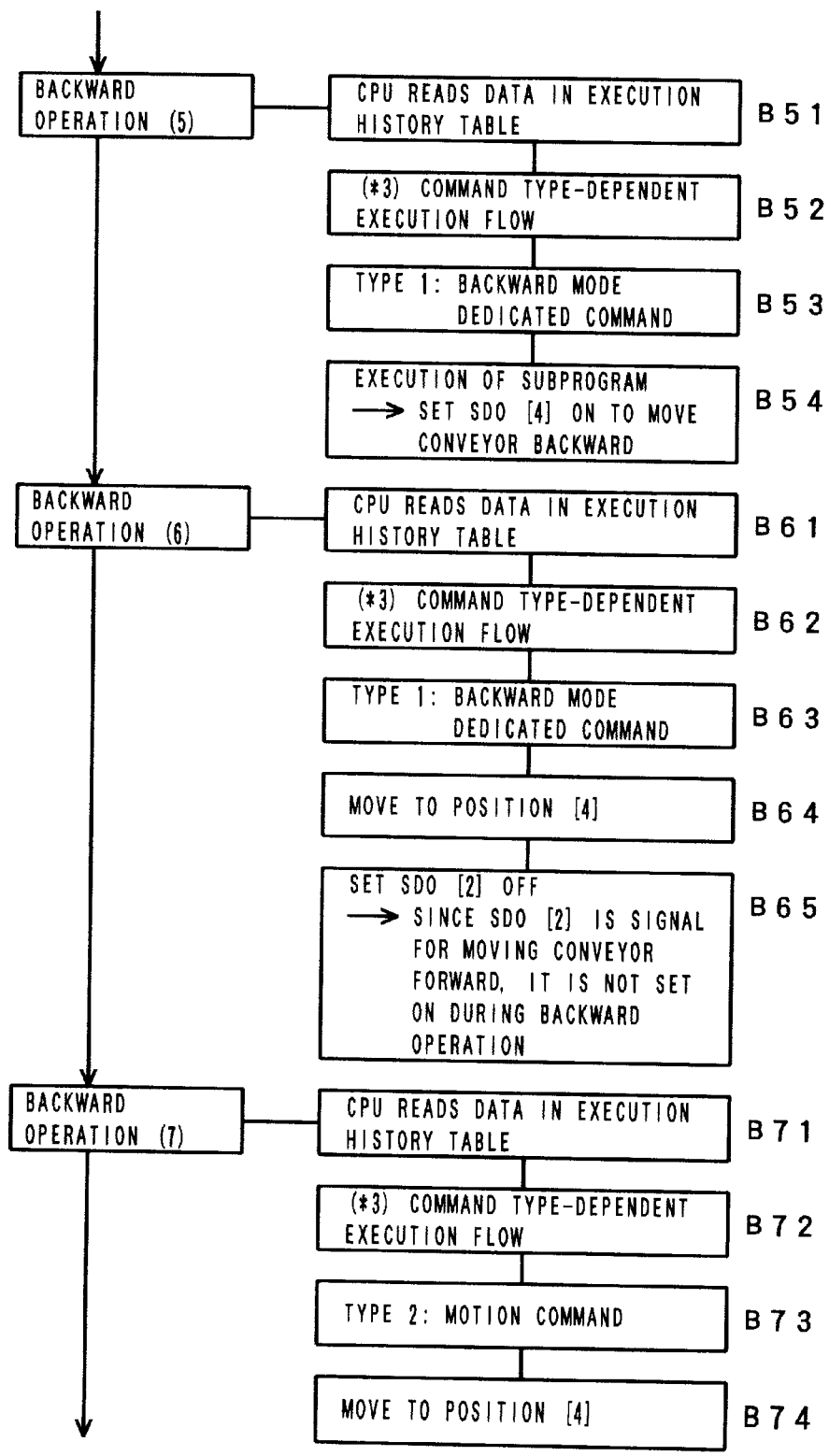
FIG. 15 is a continuation of the flowchart of FIG. 14.
Figure 16:
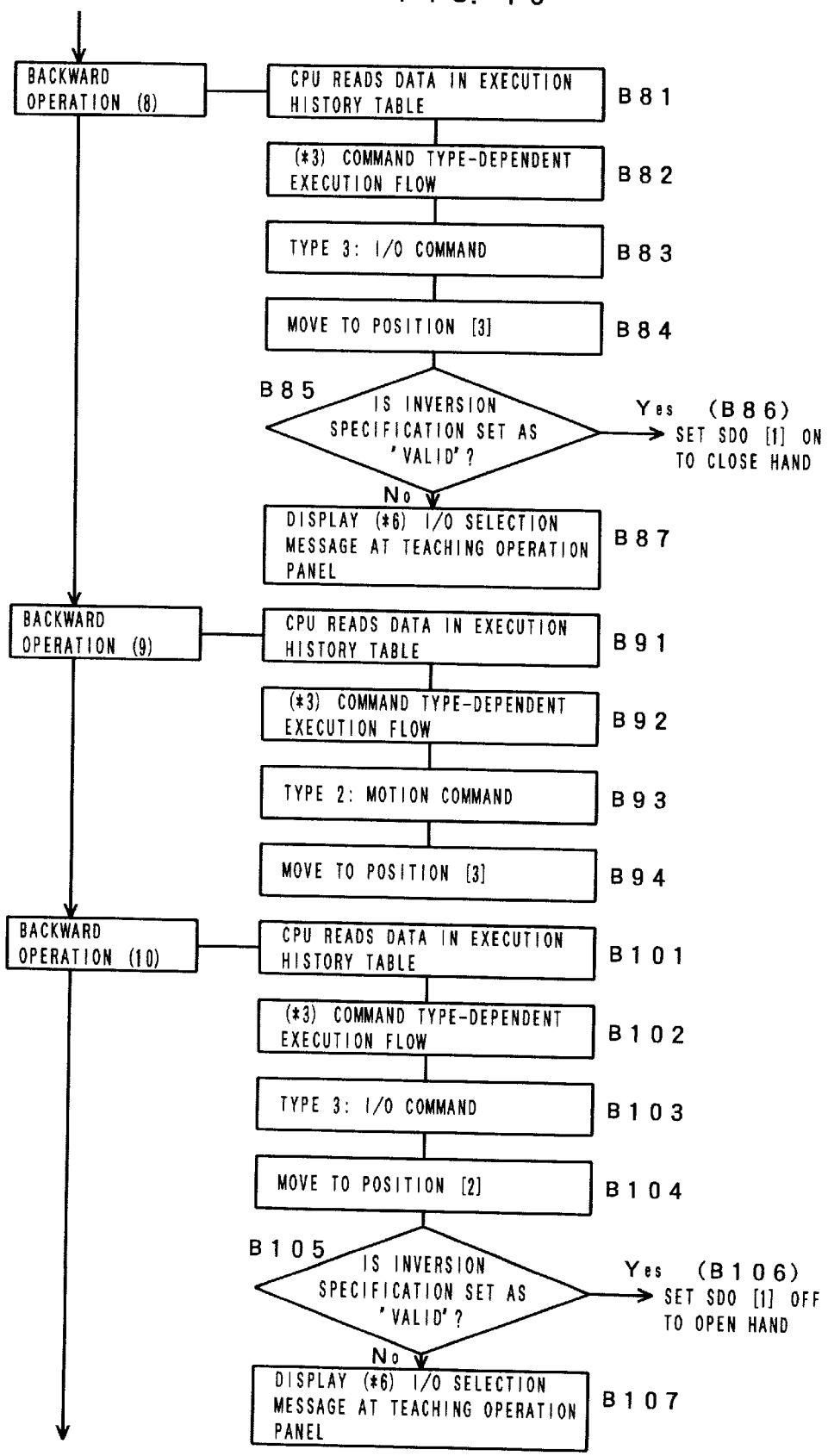
FIG. 16 is a continuation of the flowchart of FIG. 15.
Figure 17:
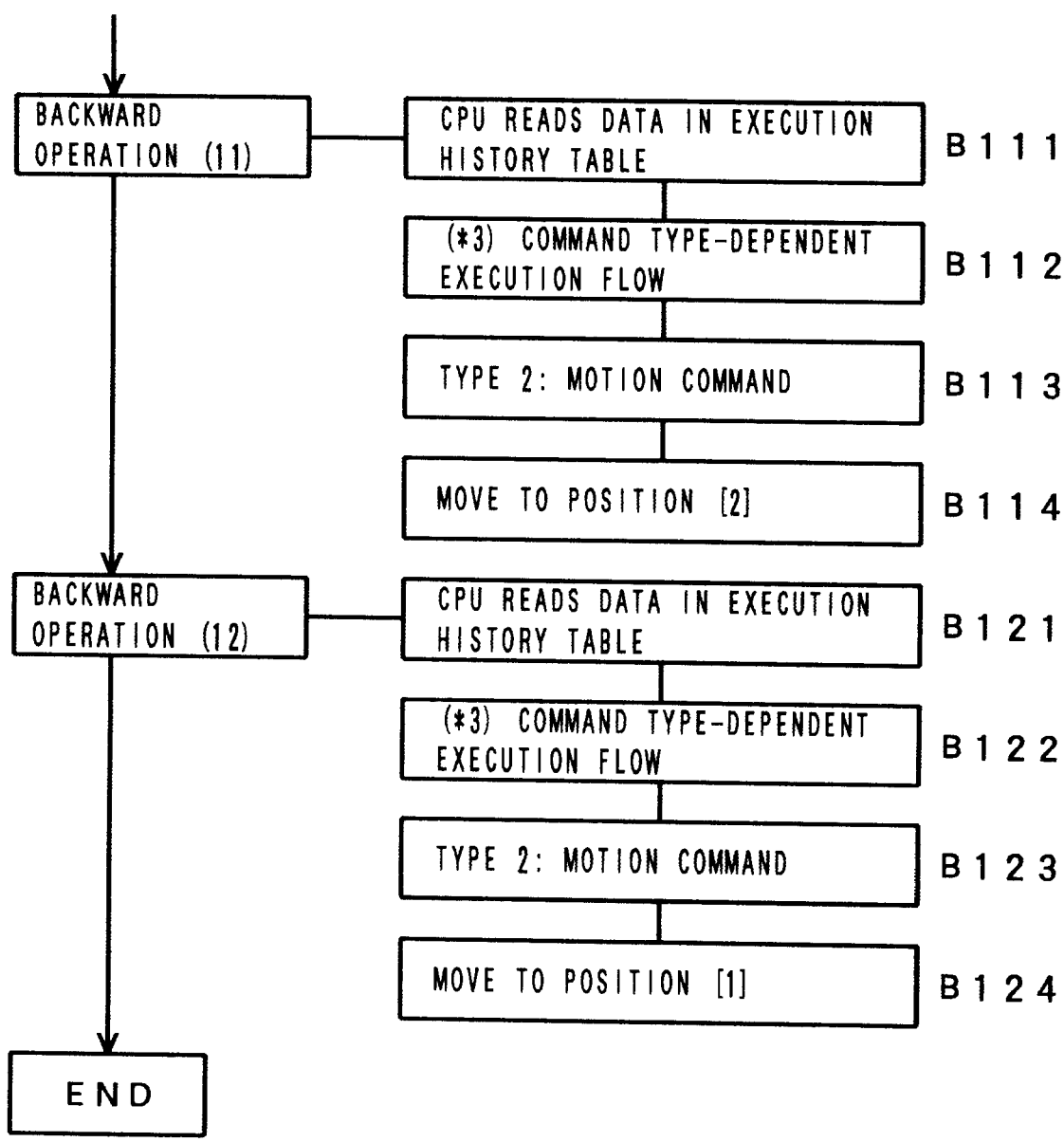
FIG. 17 is a continuation of the flowchart of FIG. 16.

In this case, the data read from the execution history table are the data in columns 1, 2 and 5 at the ninth row. Thus, the result of command type discrimination (B43) is Type 4 (computation command). In the backward process (B44), therefore, the process for restoring the register value of REG[1] to "5" described in column 5 is carried out. (FIG. 15)

[Backward Operation (5)]: Data in the execution history table is read (B51), and the process of (*3) command type-dependent execution flow (B52) is performed on the read data. Then, in accordance with the result of command type discrimination (B53), the backward process is carried out (B54).

The data read from the execution history table in this case are the data in columns 1 and 2 at the eighth row, and thus the result of command type discrimination (B53) is Type 1 (backward mode dedicated command). In the backward process, therefore, the subprogram (see the lower part of FIG. 7) is executed in compliance with the statement at row 8 of the main program, as specified by the data in column 2. Namely, the I/O signal SDO [4] is set ON to move the conveyor 3 backward (B54).

[Backward Operation (6)]: Data in the execution history table is read (B61), and the process of (*3) command type-dependent execution flow (B62) is performed on the read data. Then, in accordance with the command type discriminated in the flow (B63), the backward process is executed (B64, B65).

In this case, the data read from the execution history table are the data in columns 1 to 3 at the seventh row. Thus, the result of command type discrimination (B63) is Type 1 (backward mode dedicated command); however, unlike the case of [Backward Operation (5)], "POSITION [4]" is described in column 3 at the seventh row. In the backward process, therefore, the robot is first moved to POSITION [4] (retraction position) (B64), and then in accordance with the parenthesized command in the statement at row 7 of the main program as specified by the data in column 2, the I/O signal SDO [2] is set OFF to thereby stop the conveyor 3 (B65).

[Backward Operation (7)]: Data in the execution history table is read (B71), and the process of (*3) command type-dependent execution flow (B72) is performed on the read data. Then, in accordance with the result of the command type discrimination (B73) made in the flow, the backward process is carried out (B74).

The data read from the execution history table in this case are the data in columns 1 to 3 at the sixth row, and thus the result of command type discrimination (B73) is Type 2 (motion command). In the backward process, therefore, the process for moving the robot to POSITION [4] (retraction position) described in column 3 is executed (B74). However, in this case, since the robot has already been moved to POSITION [4] in B64 of the backward operation (6), no actual robot motion takes place.

(FIG. 16)

[Backward Operation (8)]: Data in the execution history table is read (B81), and the process of (*3) command type-dependent execution flow (B82) is performed on the read data. Then, in accordance with the result of command type discrimination (B83), the backward process is performed (B84–B87).

In this case, the data read from the execution history table are the data in columns 1 to 4 at the fifth row, and accordingly, the result of command type discrimination (B83) is Type 3 (I/O command). Since, however, "POSITION [3]" is described in column 3 at the fifth row, first, in the backward process, the robot is moved to POSITION [3] (conveyor placement position).

Subsequently, a determination is made as to the setting (valid/invalid setting) of inversion specification of the I/O command (B85), and if the set inversion specification is "valid", SDO [1] is set ON to close the hand 2 (B86) in accordance with the data in columns 2 and 4. If the inversion specification is set as "invalid", the (*6) I/O selection message (see FIG. 6) is displayed on the LCD 15 of the teaching panel 16, and in accordance with the selection of ON or OFF, SDO [1] is set ON or OFF (B87).

[Backward Operation (9)]: Data in the execution history table is read (B91), and the process of (*3) command type-dependent execution flow (B92) is performed on the read data. Then, in accordance with the result of command type discrimination (B93), the backward process is carried out (B94).

In this case, the data read from the execution history table are the data in columns 1 to 3 at the fourth row. Accordingly, the result of command type discrimination (B93) is Type 2 (motion command), and in the backward process, the process for moving the robot to POSITION [3] (conveyor placement position) described in column 3 is executed (B94). In this case, however, since the robot has already been moved to POSITION [3] in B84 of the backward operation (8), no actual robot motion takes place.

[Backward Operation (10)]: Data in the execution history table is read (B101), and the process of (*3) command type-dependent execution flow (B102) is performed on the read data. Then, in accordance with the result of command type discrimination (B103), the backward process is performed (B104–B107).

The data read from the execution history table in this case are the data in columns 1 to 4 at the third row, and therefore, the result of command type discrimination (B103) is Type 3 (I/O command). Since, however, "POSITION [2]" is described in column 3 at the third row, first, in the backward process, the robot is moved to POSITION [2] (workpiece grasping position).

Subsequently, a determination is made as to the setting (valid/invalid setting) of inversion specification of the I/O command (B105), and if the set inversion specification is "valid", SDO[1] is set OFF to open the hand 2 (B106) in accordance with the data in columns 2 and 4. If the inversion specification is set as "invalid", the (*6) 1/0 selection message (see FIG. 6) is displayed on the LCD 15 of the teaching panel 16, and in accordance with the selection of ON or OFF, SDO [1] is set ON or OFF (B107).

(FIG. 17)

[Backward Operation (11)]: Data in the execution history table is read (B111), and the process of (*3) command type-dependent execution flow (B112) is performed on the read data. Then, in accordance with the result of command type discrimination (B113), the backward process is performed (B114).

In this case, the data read from the execution history table are the data in columns 1 to 3 at the second row. Thus, the result of command type discrimination (B113) is Type 2 (motion command), and the process for moving the robot to POSITION [2] (workpiece grasping position) described in column 3 is executed (B114). Since, however, the robot has already been moved to POSITION [2] in B104 of the backward operation (10), no actual robot motion takes place.

[Backward Opemovement (12)]: Data in the execution history table is read (B121), and the process of (*3) command type-dependent execution flow (B122) is performed on the read data. Then, in accordance with the result of command type discrimination (B123), the backward process is executed (B124).

The data read from the execution history table in this case are the data in columns 1 to 3 at the first row. Accordingly, the result of command type discrimination (B123) is Type 2 (motion command), and in the backward process, the process for moving the robot to POSITION [1] (origin position on the motion path) described in column 3 is executed (B124).

[7] Operation Performed During Backward Operation Referring now to FIG. 19 similar to FIG. 18, backward operation performed when the backward operation process flow is executed in the above-described manner will be outlined.

Figure 19A:
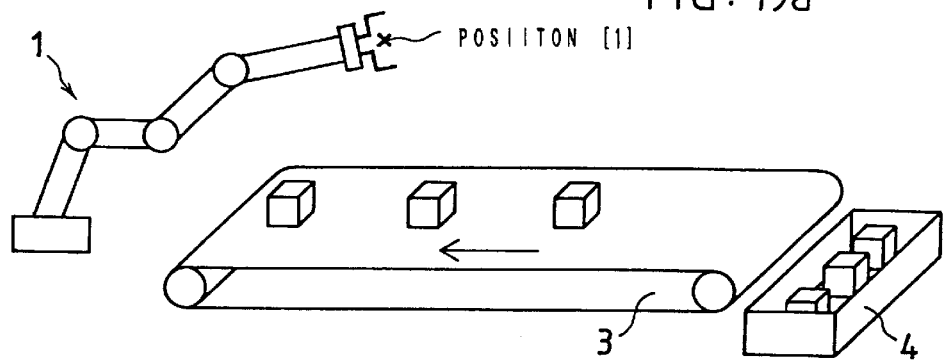
FIGS. 19a–19d are schematic diagrams of the progress of operation during a backward operation.

First, as shown in FIG. 19a, the robot 1 moves to POSITION [1] (origin position on the motion path). If, however, the robot position at the start of backward operation coincides with POSITION [1], the robot does not move in actuality. Subsequently, the index value indicative of the number of workpieces W conveyed to the workpiece box 4 is decremented by "1", and the conveyor 3 travels backward for the predetermined distance. Consequently, the workpiece W which was previously placed on the conveyor 3 returns to the conveyor placement position. These backward operations are achieved by the backward operations (1) to (5) explained above.

Figure 19B:
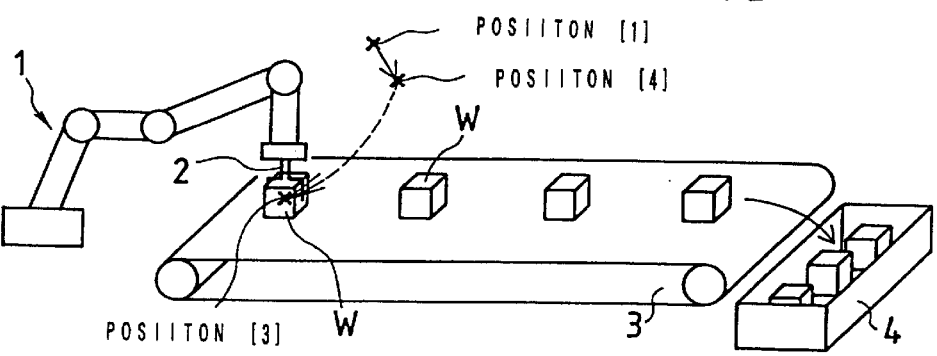

Then, as shown in FIG. 19b, the robot 1 moves to POSITION [3] (conveyor placement position) via POSITION [4] (retraction position), and closes the hand 2 to grasp the workpiece W. These backward operations are achieved by the backward operations (6) to (8) explained above.

Figure 19C:
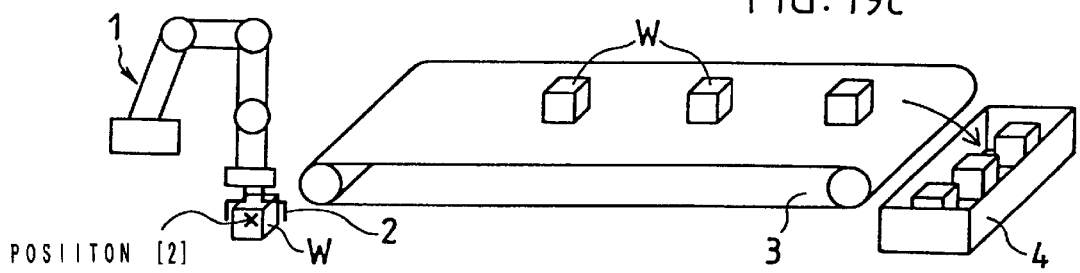

Subsequently, as shown in FIG. 19c, the robot 1 moves to POSITION [2] (grasping position) while grasping the workpiece W, and opens the hand 2 to release the workpiece W. These backward operations are achieved by the backward operations (9) to (11) explained above.

Figure 19D:
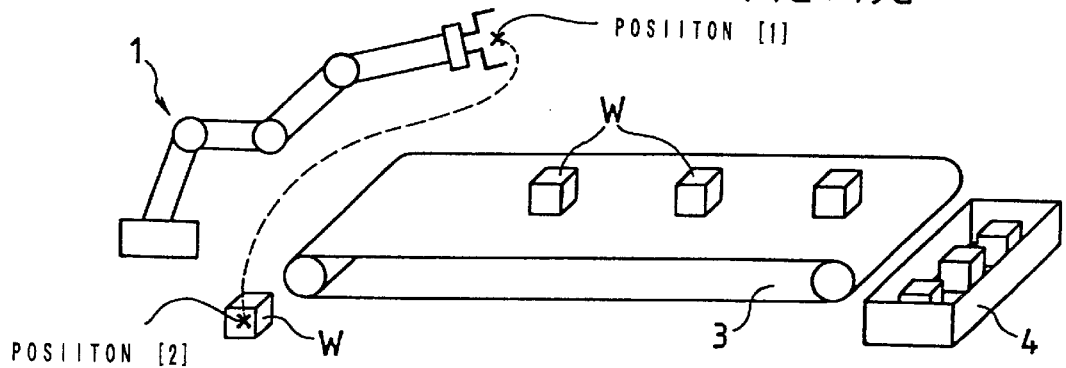

Finally, as shown in FIG. 19d, the robot 1, which has released the workpiece W, returns to POSITION [1] (origin position on the motion path). This operation is achieved by the backward operation (12) explained above.

As already mentioned with reference to FIG. 2, when the backward operation function is activated in continuous mode, the above-described backward operations are continuously executed. By activating the backward operation function in step mode, it is possible to perform the backward operations intermittently. It is preferable that only a simple key-in operation of the teaching panel 16 be required to select the continuous mode or the step mode and to perform backward operations step by step when the step mode is selected.

For example, the function of a SINGLE STEP key may be designed such that depressing the SINGLE STEP key once selects the step mode, and that depressing the SINGLE STEP key one more time returns the mode selection to the continuous mode. Also, after the step mode is selected, the aforementioned backward operations (1) to (12) may be performed in order one at a time each time a BWD key is depressed with a SHIFT key held down.

In the above description of the embodiment, the inversion specification of I/O signals is set "valid", but depending on the task type and circumstances, the inversion specification may be set "invalid" so that the operator can individually specify the I/O signal states (i.e., states of the hand etc.) during backward operations.

Further, when a backward operation is performed (e.g., when the BWD key is depressed), preferably an alarm signal is output to the LCD 15 associated with the teaching panel, an alarm lamp, a buzzer, etc. connected to the general-purpose interface 19, to call the operator's attention and thereby secure the safety of the operator.

Thus, the present invention remarkably expands the backward operation function of the robot control device and enhances the usefulness to the operator. Specifically, the backward operation can be performed as desired while permitting optional settings of various operations other than the motions of the robot itself (motion involving the input/output of an external signal such as opening/closing of the hand or the spot gun, computation such as addition or subtraction of the register value, etc.). Also, even in the case where a branch command is executed during forward operation, backward operation based on correct execution history can be achieved, taking the branch command into account. Further, when the backward operation function is activated, the backward mode executable program or command can also be executed in combination.

What is claimed is:

1. A robot control apparatus for controlling a robot and a cooperative device for cooperation with said robot, comprising:

first storing means for storing an operation program including at least one statement for specifying an operation of said robot and at least one statement for specifying an operation of said cooperative device;

forward operation processing means for performing processing of operating said robot and said cooperative device forward in accordance with said operation program;

second storing means for storing history data of the forward operations of said robot and said cooperative device when said forward operation processing is performed;

backward operation processing means for performing processing of operating the robot backward so that history of the forward operation of said robot is retraced based on said history data stored in said second storing means; and means for selectively setting one of continuous mode and step mode for said backward operation.

2. A robot control apparatus for controlling a robot and a cooperative device for cooperation with said robot, comprising:

first storing means for storing an operation program including at least one statement for specifying an operation of said robot and at least one statement for specifying an operation of said cooperative device;

forward operation processing means for performing processing of operating said robot and said cooperative device forward in accordance with said operation program;

second storing means for storing history data of the forward operations of said robot and said cooperative device when said forward operation processing is performed;

backward operation processing means for performing processing of operating the robot backward so that history of the forward operation of said robot is retraced based on said history data stored in said second storing means; and means for calling an attention of an operator during said backward operation.

3. A robot control apparatus for controlling a robot and a cooperative device for cooperation with said robot, comprising:

first storing means for storing an operation program including at least one statement for specifying an operation of said robot and at least one statement for specifying an operation of said cooperative device;

forward operation processing means for performing processing of operating said robot and said cooperative device forward in accordance with said operation program;

second storing means for storing history data of the forward operations of said robot and said cooperative device when said forward operation processing is performed; and backward operation processing means for performing processing of operating the robot backward so that history of the forward operation of said robot is retraced based on said history data stored in said second storing means, wherein said at least one statement for specifying the operation of said cooperative device includes an input/output command relating to an input/output of a signal for determining status of said cooperative device, said history data includes data indicative of the status of said cooperative device before the status changes in response to the input/output command during said forward operation, and said backward operation processing means performs said backward operation processing based on the history data indicative of the status before a status change so that the status of said cooperative device is restored.

4. The robot control apparatus according to claim 3, further comprising means for selectively invalidating restoration of the status of said cooperative device during said backward operation processing.

5. A robot control apparatus for controlling a robot and a cooperative device for cooperation with said robot, comprising:

first storing means for storing an operation program including at least one statement for specifying an operation of said robot and at least one statement for specifying an operation of said cooperative device;

forward operation processing means for performing processing of operating said robot and said cooperative device forward in accordance with said operation program;

second storing means for storing history data of the forward operations of said robot and said cooperative device when said forward operation processing is performed; and backward operation processing means for performing processing of operating the robot backward so that history of the forward operation of said robot is retraced based on said history data stored in said second storing, wherein said at least one statement for specifying the operation of said cooperative device includes an input/output command relating to an input/output of a signal for determining an open/closed status of a robot hand, said history data includes data indicative of the open/closed status of said robot hand before the status changes in response to the input/output command during said forward operation, and said backward operation processing means performs the backward operation processing based on the history data indicative of the status before a status change so that the open/closed status of said robot hand is restored.

6. The robot control apparatus according to claim 5, further comprising means for selectively invalidating restoration of the open/closed status of said robot hand during said backward operation processing.

7. A robot control apparatus for controlling a robot and a cooperative device for cooperation with said robot, comprising:

first storing means for storing an operation program including at least one statement for specifying an operation of said robot and at least one statement for specifying an operation of said cooperative device;

forward operation processing means for performing processing of operating said robot and said cooperative device forward in accordance with said operation program;

second storing means for storing history data of the forward operations of said robot and said cooperative device when said forward operation processing is performed; and backward operation processing means for performing processing of operating the robot backward so that history of the forward operation of said robot is retraced based on said history data stored in said second storing means, wherein said at least one statement for specifying the operation of said cooperative device includes a computation command, said history data includes data indicative of a computation value before the value changes in response to the computation command during said forward operation, and said backward operation processing means performs the backward operation processing based on the history data indicative of the computation value before a value change so that the computation value is restored.

8. A robot control apparatus for controlling a robot and a cooperative device for cooperation with said robot, comprising:

first storing means for storing an operation program including at least one statement for specifying an operation of said robot and at least one statement for specifying an operation of said cooperative device;

forward operation processing means for performing processing of operating said robot and said cooperative device forward in accordance with said operation program;

second storing means for storing history data of the forward operations of said robot and said cooperative device when said forward operation processing is performed; and backward operation processing means for performing processing of operating the robot backward so that history of the forward operation of said robot is retraced based on said history data stored in said second storing means, wherein said operation program includes a backward operation dedicated command to be executed only during backward operation, said history data includes data of said backward operation dedicated command, and said backward operation processing means executes said backward operation dedicated command in accordance with the history data of said backward operation dedicated command.

9. A robot control apparatus for controlling a robot and a cooperative device for cooperation with said robot, comprising:

first storing means for storing an operation program including at least one statement for specifying an operation of said robot and at least one statement for specifying an operation of said cooperative device;

forward operation processing means for performing processing of operating said robot and said cooperative device forward in accordance with said operation program;

second storing means for storing history data of the forward operations of said robot and said cooperative device when said forward operation processing is performed; and backward operation processing means for performing processing of operating the robot backward so that history of the forward operation of said robot is retraced based on said history data stored in said second storing means, wherein said operation program includes a start command to start a subprogram which includes a backward operation dedicated command to be executed only during backward operation, said history data includes data of said subprogram start command, and said backward operation processing means executes said subprogram in accordance with the history data of said subprogram start command.

10. A robot control apparatus, comprising:
a forward operation unit to operate a robot and a cooperative device in a forward operation in accordance with an operation program including at least one statement specifying an operation of the robot and cooperative device;
a storing unit to store history data of the forward operations of the robot and the cooperative device when the forward operation unit is operated; and
a backward operation unit to operate the robot and cooperative device backward so that the stored history data of forward operations is retraced,
wherein the at least one statement specifying the operation of the cooperative device includes an input/output command relating to an input/output of a signal for determining the status of the cooperative device, the history data includes data indicative of the status of the cooperative device before the status changes in response to the input/output command during the forward operation, and the backward operation unit performs the backward operation based on the history data indicative of the status before a status change so that the status of the cooperative device is restored.

11. A robot control apparatus, comprising:
a forward operation unit to operate a robot and a cooperative device in a forward operation in accordance with an operation program including at least one statement specifying an operation of the robot and cooperative device;
a storing unit to store history data of the forward operations of the robot and the cooperative device when the forward operation unit is operated; and
a backward operation unit to operate the robot and cooperative device backward so that the stored history data of forward operations is retraced,
wherein the at least one statement specifying the operation of the cooperative device includes an input/output command relating to an input/output of a signal for determining an open/closed status of a robot hand, the history data includes data indicative of the open/closed status of said robot hand before the status changes in response to the input/output command during the forward operation, and the backward operation processing unit operates based on the history data indicative of the status before a status change so that the open/closed status of the robot hand is restored.

12. A robot control apparatus, comprising:
a forward operation unit to operate a robot and a cooperative device in a forward operation in accordance with an operation program including at least one statement specifying an operation of the robot and cooperative device;
a storing unit to store history data of the forward operations of the robot and the cooperative device when the forward operation unit is operated; and
a backward operation unit to operate the robot and cooperative device backward so that the stored history data of forward operations is retraced,
wherein the at least one statement specifying the operation of the cooperative device includes a computation command, the history data includes data indicative of a computation value before the value changes in response to the computation command during the forward operation, and the backward operation unit operates based on the history data indicative of the computation value before a value change so that the computation value is restored.

13. A robot control apparatus, comprising:
a forward operation unit to operate a robot and a cooperative device in a forward operation in accordance with an operation program including at least one statement specifying an operation of the robot and cooperative device;
a storing unit to store history data of the forward operations of the robot and the cooperative device when the forward operation unit is operated; and
a backward operation unit to operate the robot and cooperative device backward so that the stored history data of forward operations is retraced,
wherein the operation program includes a backward operation dedicated command to be executed only during backward operation, the history data includes data of the backward operation dedicated command, and the backward operation unit executes the backward operation dedicated command in accordance with the history data including the backward operation dedicated command.

14. A robot control apparatus, comprising:
a forward operation unit to operate a robot and a cooperative device in a forward operation in accordance with an operation program including at least one statement specifying an operation of the robot and cooperative device;
a storing unit to store history data of the forward operations of the robot and the cooperative device when the forward operation unit is operated; and
a backward operation unit to operate the robot and cooperative device backward so that the stored history data of forward operations is retraced,
wherein the operation program includes a start command to start a subprogram which includes a backward operation dedicated command to be executed only during backward operation, the history data includes data of the subprogram start command, and the backward operation unit executes the subprogram in accordance with the history data including the subprogram start command.

15. A robot control apparatus, comprising:
a forward operation unit to operate a robot and a cooperative device in a forward operation in accordance with an operation program including at least one statement specifying an operation of the robot and cooperative device;
a storing unit to store history data of the forward operations of the robot and the cooperative device when the forward operation unit is operated; and
a backward operation unit to operate the robot and cooperative device backward so that the stored history data of forward operations is retraced,
wherein the backward operation unit selectively sets either a continuous mode or step mode for the backward operation.

* * * * *